United States Patent
Bosse et al.

(10) Patent No.: US 12,552,409 B1
(45) Date of Patent: Feb. 17, 2026

(54) VEHICLE CONTROL USING MACHINE-LEARNED ATTENTION OVER SPATIOTEMPORALLY ENCODED SENSOR DATA

(71) Applicant: Zoox, Inc., Foster City, CA (US)

(72) Inventors: Michael Carsten Bosse, Templeton, CA (US); Jackson Owen Waschura, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 68 days.

(21) Appl. No.: 18/759,596

(22) Filed: Jun. 28, 2024

(51) Int. Cl.
| | |
|---|---|
| *B60W 60/00* | (2020.01) |
| *G01S 13/86* | (2006.01) |
| *G01S 17/89* | (2020.01) |
| *G06T 7/20* | (2017.01) |
| *G06V 10/44* | (2022.01) |

(52) U.S. Cl.
CPC ......... *B60W 60/001* (2020.02); *G01S 13/865* (2013.01); *G01S 13/867* (2013.01); *G01S 17/89* (2013.01); *G06T 7/20* (2013.01); *G06V 10/44* (2022.01); *G06V 2201/07* (2022.01)

(58) Field of Classification Search
CPC .... B60W 60/001; G01S 13/867; G01S 17/89; G06V 10/44; G06V 2201/07; G06T 7/20
See application file for complete search history.

(56) References Cited

U.S. PATENT DOCUMENTS

| | | | |
|---|---|---|---|
| 2023/0195122 A1* | 6/2023 | Shenfeld | G06V 20/588 701/26 |
| 2024/0249465 A1* | 7/2024 | Guizilini | G06V 20/56 |
| 2025/0265781 A1* | 8/2025 | Baradel | G06T 17/00 |

OTHER PUBLICATIONS

Miyato et al., "GTA: A Geometry-Aware Attention Mechanism for Multi-View Transformers," arXiv:2310.10375v1 [cs.CV] Oct. 16, 2023, 26 pages.

Su et al., "RoFormer: Enhanced Transformer with Rotary Position Embedding," arXiv:2104.09864v5 [cs.CL] Nov. 8, 2023, 14 pages.

* cited by examiner

Primary Examiner — Tan Q Nguyen
(74) Attorney, Agent, or Firm — Lee & Hayes, P.C.

(57) ABSTRACT

Detecting, tracking, and/or predicting a future state of an object may include encoding spatiotemporal data associated with sensors that generate sensor data used to detect, track, and predict future state data of the object. A first machine-learned model may generate an embedding for a subset of sensor data associated with a ray emanating from a sensor and the embedding may be encoded with spatial characteristics of the sensor that received the subset and a time at which the subset was received. This and other spatiotemporally-encoded embeddings may be used by a second machine-learned model to determine an aggregated embedding that may be used for object detection, tracking, and/or prediction.

20 Claims, 7 Drawing Sheets

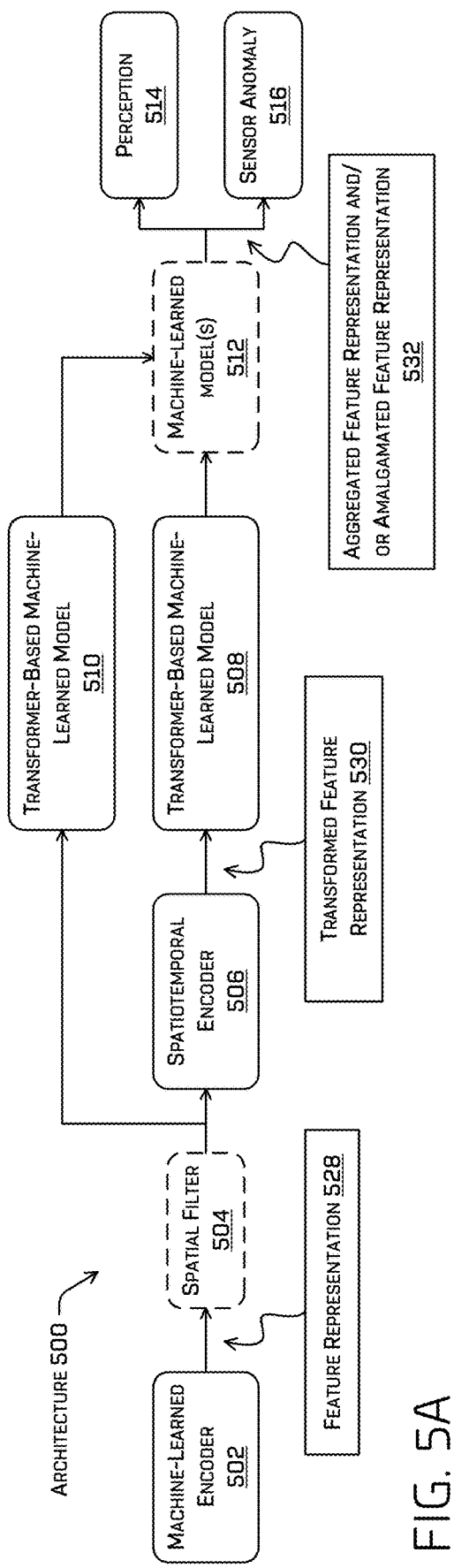
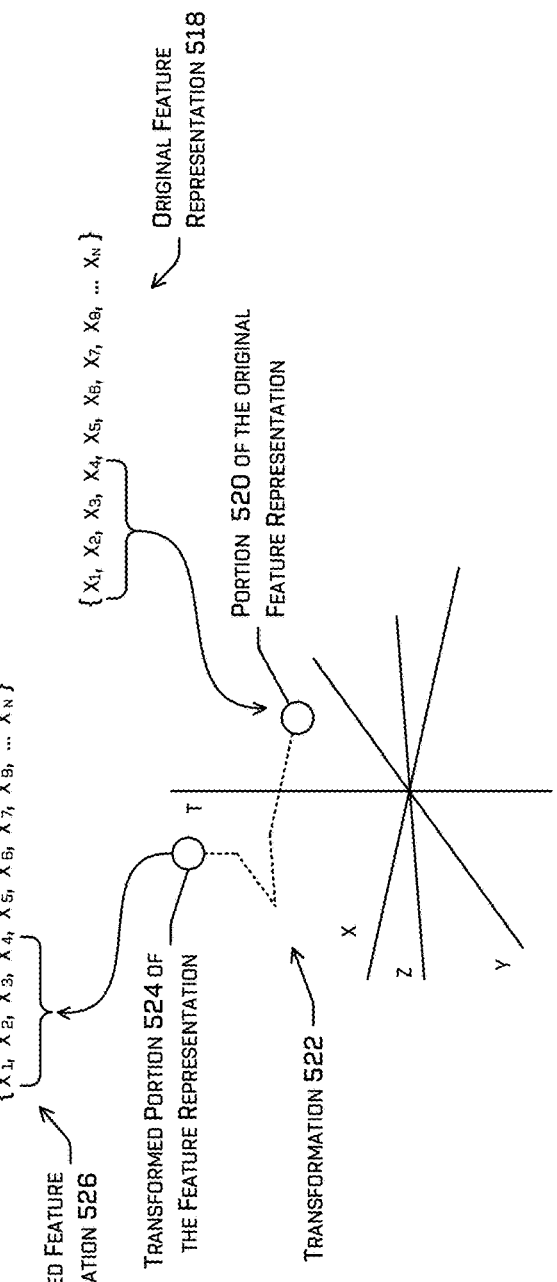
FIG. 5A
FIG. 5B

VEHICLE CONTROL USING MACHINE-LEARNED ATTENTION OVER SPATIOTEMPORALLY ENCODED SENSOR DATA

BACKGROUND

Autonomous vehicles may use sensors to capture data regarding an environment through which the autonomous vehicles traverse. Since autonomous vehicles may include two or more different types of sensors and the sensor data may widely vary in its format and what different sensors can detect or may be obstructed by, the detections generated by two different sensor types may differ and such discrepancies may make it difficult to track objects and/or determine which different sensor data corresponds to a same portion of an object. Moreover, a particular type of sensor data may fail to include enough data to reliably control an autonomous vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 5A illustrates an example architecture for generating the data structure discussed herein, which may be used by any of a number of downstream component(s), such as a perception component and/or a sensor anomaly detection component.

FIG. 5B illustrates an example spatiotemporal transformation of at least part of an original feature representation.

DETAILED DESCRIPTION

Figure 1:
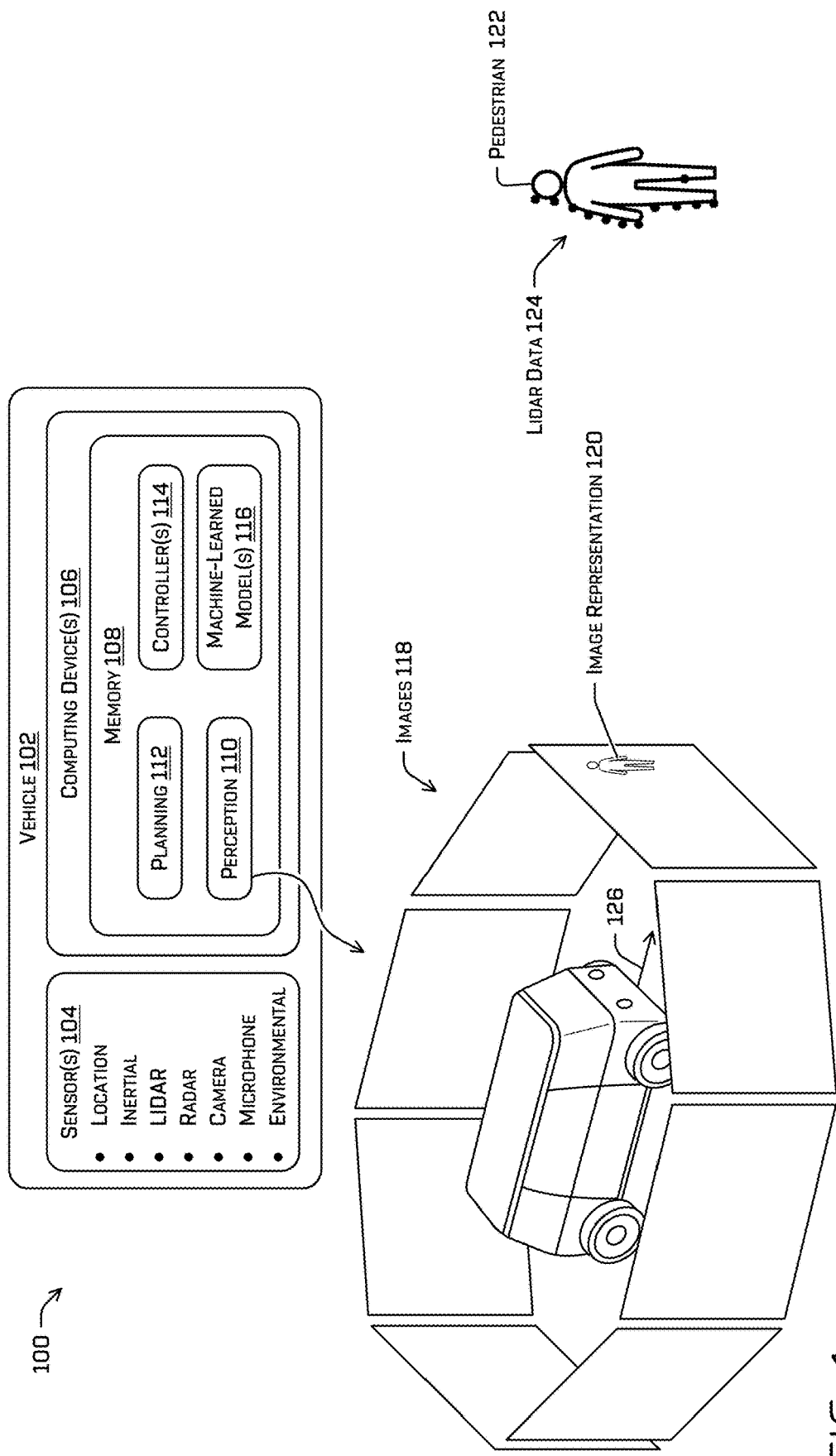
FIG. 1 illustrates an example scenario including an autonomous vehicle that collects sensor data as it operates in an environment.

Techniques (e.g., hardware, software, and/or machine-learned model(s)) for detecting and/or tracking a current and/or previous position and/or heading (i.e. pose), velocity, acceleration, and/or or the like of an object, and/or detecting a sensor anomaly using sensor data may comprise generating a data structure using sensor data received at a vehicle and using the data structure as input to machine-learned model(s) trained to use the data structure as input. For example, the machine-learned model(s) may include a machine-learned model trained to detect and/or track an object, a machine-learned model trained to detect sensor anomalies, and/or the like. The sensor data may be received from two or more sensors and may additionally or alternatively comprise sensor data received from different types of sensors (e.g., RGB camera, infrared camera, grayscale camera, lidar sensor, radar sensor, time-of-flight (ToF) sensor).

In some examples, the data structure may comprise an image or other feature map indicating feature representations generated by one or more machine-learned models using the sensor data. The feature map may indicate the feature representations using polar (spherical), cylindrical, or any other coordinates with an origin associated with a vehicle (e.g., a center of mass, a center, a predicted center). A feature representation may comprise an embedding (e.g., a vector or tensor) determined by a machine-learned model based at least in part on a subset of sensor data. For example, the techniques described herein may comprise pre-generating, e.g., via ray casting within a frustum of the sensor, a set of rays (e.g., indicated as unit direction vectors) originating from each sensor's origin and may determine, for a particular ray, a portion of sensor data that the ray intersects. To give a simple example, if the sensor data comprises an image from a camera, pre-generation may comprise determining a set of rays projecting from a sensor of the camera and an area bounded by the frustum of the camera. The techniques may comprise determining a pixel of the image that one of these rays intersects. A machine-learned model may determine a feature representation using that pixel's image data, other sensor data related to that pixel (e.g., lidar data and/or radar data that is associated with the pixel and/or context window by virtue of a determination that a projection of such lidar data and/or radar data into the image space is contained by the pixel and/or context window) and/or the ray, and/or image data and/or other data associated with other pixels within a context window around the pixel (e.g., within a threshold distance of the pixel). The feature representation determined by the machine-learned model may be associated with the ray and used for further processing to determine the feature representations indicated by the data structure.

In some examples where a depth estimate may be associated with the sensor data, such as for lidar, radar, stereo camera, or image output that has been pre-processed by a machine-learned model that predicts a depth associated with different portions of an image, any portion of the ray that lies beyond the depth estimate may be indicated as being occluded. In other words, the feature representation may be prevented from being associated with a portion of the ray at the distance from the sensor indicated by the depth onwards. For sensor data for which no depth estimate is measured or estimated, the feature representation may be associated with the entirety of the ray or up to a pre-set distance, such as a maximum estimated effective range of a sensor of that type.

In some examples, once a feature representation has been determined for a ray, the techniques may comprise spatiotemporally transforming the feature representation based at least in part on a sensor pose, a time at which the sensor data was received, and/or a velocity indicated by the sensor data, such as indicated by radar data, or a velocity of the sensor. This spatiotemporal transformation may comprise treating a portion of the feature representation as if it were an indication of locational coordinates, a time, and/or a velocity. In other words, the spatiotemporal transformation encodes sensor location, time the sensor data was received, and/or velocity into the feature representation. In an example where the spatiotemporal transformation encodes a position and orientation of the sensor and a time at which the sensor data was received for which the feature representation was generated, the feature representation may be broken into sets of five values where each set is treated as if it indicates x, y, and z coordinates of the location of the sensor, an orientation of the sensor, and a time at which the sensor data was received. However, as discussed above, the feature representation may be an embedding indicating characteristics of the sensor data that wasn't originally generated to indicate a location, time, etc. Nonetheless, according to the techniques discussed herein, a set of values of the feature representation may be treated as if it indicates spatiotemporal information (e.g., a location and/or orientation of the sensor and/or a velocity indicated in the sensor data or associated with the sensor) and may be spatiotemporally transformed by a transformation matrix associated with the sensor pose and the time at which the sensor data was received. This transformation may comprise altering the sets that compose the feature representation according to the sensor's transformation matrix and concatenating the transformed sets together to form a transformed feature representation.

In some examples, the transformation matrix for a sensor may be determined based at least in part on the extrinsic parameters associated with the sensor, such as a pose (i.e., position and orientation) of the sensor, a time at which the sensor received sensor data that was used to generate the feature representation, and/or a velocity determined by or associated with the sensor. In some examples, the transformation matrix may be determined as part of calibrating the sensor and/or as part of simultaneous localization and mapping conducted by the vehicle, which may be used to detect perturbations to an original calibrated pose of a sensor.

A sensor may have a plurality of rays associated therewith where all of the rays are within a field of view of the sensor. Accordingly, different feature representations may be determined for different respective portions of sensor data received by the sensor data and associated with different rays for that sensor. These rays may be pre-determined via ray-casting and based on intrinsic parameters associated with the sensor, such as focal length, aperture, field-of-view, resolution, and/or the like. In some examples, the transformation discussed herein may be applied to each of the feature representations determined for a particular sensor's data. Since an autonomous vehicle may comprise multiple sensors and, in some cases, multiple types of sensors, transformed feature representations may be determined for up to each sensor and up to all the rays associated with each sensor using the transformation matrix associated with each sensor respectively.

This set of transformed feature representations may then be used by a downstream machine-learned model, such as a perception component and/or a sensor anomaly detection component, to determine various outputs. Additionally or alternatively, the set of transformed feature representations or a subset thereof may be used by a transformer-based machine-learned model to determine an aggregated feature representation for a ray. This may comprise determining one or more layers of cross-attention between the transformed feature representation associated with a ray (as a query) and the set or subset of transformed feature representations (as a key) to determine the aggregated feature representation for the ray. Additionally or alternatively, determining the aggregated feature representation of a ray may comprise cross-attending the original (untransformed) feature representation (as a query) with the set or subset of original feature representations (as a key) determined for the other rays. In such an example, the cross-attention output between the transformed feature representations (i.e., a first embedding) and the cross-attention output between the original feature representations (i.e., a second embedding) may be provided as input into a machine-learned model, such as a feed-forward neural network, multi-layer perceptron (MLP), or Kolmogorov-Arnald network (KAN), or the like to determine the aggregated feature representation associated with the ray. The architecture described above (i.e., cross-attention between transformed feature representations or dual cross-attention between transformed feature representations and original feature representations fed into a final model) may compose a single block. The architecture discussed herein may comprise one or more such blocks to determine the final aggregated feature representation to be associated with a ray. In some examples, the cross-attention architecture may be repeated to determine an aggregated feature representation for up to each ray.

Additionally or alternatively, instead of cross-attending between a first feature representation (a transformed feature representation or both a transformed feature representation and an original feature representation) and all of the other feature representations of the same type (i.e., transformed or original, respectively), the techniques discussed herein may comprise determining a subset of feature representations to cross-attend with a feature representation. For example, determining the subset of feature representations may comprise determining ray(s) that are within a minimum distance of the ray for which an aggregated feature representation is to be generated. Additionally or alternatively, determining the subset of feature representations may comprise determining ray(s) having an angle from the ray for which an aggregated feature representation is to be generated. Additionally or alternatively, the subset may be determined based at least in part on determining ray(s) associated with other sensor(s) that lie within an epipolar plane around the ray (e.g., an epipolar plane defined by a region around the ray). The subset of feature representations used for cross-attention may be the feature representations associated with the ray(s) determined according to any of the examples given above or a combination thereof.

Although the techniques may determine an aggregated feature representation using such a set, it is also contemplated that the training of the cross-attention architecture discussed herein may functionally end up down-weighting those feature representations associated with environment portion(s) and/or object(s) that are irrelevant to a portion of the environment and/or object associated with the ray for which an aggregated feature representation is being generated.

In some examples, once aggregated feature representations have been determined for the rays, these aggregated feature representations may additionally or alternatively be used by downstream machine-learned model(s), such as a perception component and/or sensor anomaly detection component, to determine their respective outputs.

The techniques may additionally or alternatively comprise determining an aggregated feature representation to associate with an exterior portion of a data structure. For example, the data structure may comprise an image that may indicate aggregated feature representations indexed using polar (spherical), cylindrical, or any other coordinates. In some examples, an origin of the data structure may be centered at a center of vehicle, a center of mass of the vehicle, or the like. For example, the image may indicate a 360 degree feature representation of the environment of the vehicle. In some examples, the data structure may indicate, e.g., at a pixel or other portion of the data structure, an aggregation of the feature representations (transformed feature representations or aggregated feature representations). In other words, instead of indicating a color value, the pixel may indicate an embedding that is an aggregation of feature representations determined to be associated with the pixel. Moreover, the pixel may be referenced according to polar, cylindrical, triangular, or other coordinates as opposed to an image's traditional two-dimensional rectangular coordinates. Additionally or alternatively, such coordinates may have an infinite radius or a maximum radius associated with a maximum effective distance of a type of sensor that has the longest effective operating distance (e.g., a distance at which the accuracy of the sensor rolls off, i.e., falls below a threshold accuracy).

Determining the aggregated feature representation to associate with such a pixel or region of pixels may comprise the ray(s) that like at or between a yaw angle and height or range of yaw angles and heights (in a cylindrical coordinates example), or a yaw angle and pitch angle or range of yaw angles and pitch angles (in a polar/spherical coordinates example) for a ray (or area or volume around a ray, e.g., that may defined by threshold distance(s) tangent from the ray). In other words, the pixel or group of pixels may be defined by a coordinate or range of coordinates and the techniques may comprise determining the ray(s) that intersect that coordinate or range of coordinates. The radius for either a cylindrical exterior portion or spherical exterior portion may be infinite, undefined, or indicated to be a radius that meets or exceeds a maximum range of a sensor of the vehicle (e.g., a maximum effective, i.e., reliable/accuracy meeting and/or exceeding a threshold accuracy, distance at which a longest range sensor performs).

Any feature representation(s) (transformed feature representation(s) or aggregated feature representation(s)) associated with the ray(s) that intersect the coordinate or range of coordinates associated with the pixel or group of pixels may be amalgamated together, e.g., via concatenation, summation, or by another machine-learned model (e.g., a MLP, KAN, transformer-based machine-learned model). This amalgamated feature representation may be associated with the pixel or group of pixels. Once the data structure has been populated with any such amalgamated feature representations, the data structure may be used by downstream component(s) to determine various inputs.

In some examples, a perception component of a vehicle may use such a data structure, the transformed feature detections, or the aggregated feature detections to detect and/or track an object. For example, the perception component may comprise one or more machine-learned models trained to use the data structure as input and to determine region of interest (ROI) (e.g., a bounding volume, a bounding polygon), a semantic segmentation and/or instance segmentation of sensor data associated with the object, position and/or orientation, velocity and/or acceleration (e.g., longitudinal, lateral, angular), classification (e.g., pedestrian, cyclist, passenger vehicle, oversized vehicle, delivery vehicle, signage, building), and/or the like associated with an object. The perception component may additionally or alternatively use a series of these data structures to generate such object detections and determine which object detections are associated with a same object as a track of the object. In some examples, the object track may indicate that different object detections are associated with a same object and may, accordingly indicate current and/or historical object detection data related to the object.

In some examples, the object detection and/or track may be added to the data structure discussed herein, either by appending the raw object detection and/or track data with a respective portion of the data structure (e.g., a set of voxels of the voxel grid associated with the space occupied by the object and a part of the exterior portion associated with the object's profile). Additionally or alternatively, the object detection may be added to the data structure as a feature representation determined by a machine-learned model that may be concatenated, summed, averaged, or fused with the feature representation indicated by a pixel or group of pixels of the data structure by determining a new feature representation using the object detection/track feature representation and the current feature representation indicated by the voxel or part of the exterior portion.

Additionally or alternatively, the raw sensor data may be provided to the perception component before, during, after, or as part of generating the data structure. In such an example, the perception component may determine the object detection and/or track using the raw sensor data and a feature representation of that object detection may be mapped to the pixel or group of pixels and used in conjunction with the raw sensor data's feature representations using the ray casting technique described above to determine the final feature representation for populating a voxel and/or an aggregated feature representation for a part of the exterior portion.

Additionally or alternatively, the data structure, transformed feature representations, and/or aggregated feature representations may be used by a sensor anomaly detection component to detect a sensor anomaly. For example, the sensor anomaly detection component may comprise one or more machine-learned models trained to detect a previously unknown latency in sensor data, determine that a pose of a sensor has change compared to an initial or calibrated pose of the sensor, or determine that a sensor was miscalibrated. In some examples, responsive to such a detection, the vehicle may update a transformation matrix associated with the sensor to indicate the latency (e.g., by shifting a time associated with sensor data received by the sensor by the latency time period) and/or by altering a pose indicated by the transformation matrix. Ultimately, this change to the transformation matrix may alter the encoding of the transformed feature representation(s) determined for that sensor.

In some examples, training the sensor anomaly detection component may comprise shifting a time and/or pose associated with training sensor data by a time period and/or distance and/or angle; determining, by the sensor anomaly detection component and based at least in part on an aggregated feature representation or transformed feature representation determined for the sensor (which may be based at least in part on the training sensor data) and by the architecture discussed above, an estimated latency and/or estimated offset of the pose of the sensor; determining a first loss based at least in part on a difference between the estimated latency and the time period and/or a second loss based at least in part on a difference between the offset of the pose and the distance and/or angle by which the pose was altered; and altering one or more parameters of the sensor anomaly detection component to reduce the loss. For example, altering the one or more parameters of the sensor anomaly detection component may be determined as part of a gradient descent algorithm.

In some examples, the machine-learned model(s) discussed herein for determining the feature representations may comprise neural networks, transformer encoder(s), and/or the like for determining an embedding (e.g., a vector or tensor). In some examples, different machine-learned model(s) may be trained per sensor type or a single machine-learned model may be trained to output such an embedding using sensor data from multiple sensor type(s). Regardless, the machine-learned model(s) may be pre-trained, such as by using reconstruction training, which doesn't require ground truth data, or by using ground truth labelling of the data structure or of the input sensor data to train the model. In an example using reconstruction training, the machine-learned model(s) may include an encoder that determines an embedding for the sensor data or a subset of the sensor data associated with a particular sensor type and a decoder determines a reconstruction (predicted estimate) of the original data input into the encoder. The training may comprise determining a loss based at least in part on a difference between the reconstruction and the original sensor data and using the loss, as part of gradient descent and backpropagating the loss, to alter parameter(s) of the encoder and the decoder to reduce the loss. The decoder may be removed after training is complete, e.g., when the average loss of the last n (a positive integer) losses is below a threshold loss, a number of epochs or batches is complete, or the losses otherwise indicate diminishing returns, and the encoder may be used to determine the feature representation(s) discussed herein.

In some examples, pre-training the machine-learned model(s) using a reconstruction loss may additionally or alternatively comprise masking a portion of the input data, such as by filling a percentage of the perception data and/or the map data with nonce data (e.g., 0, removing a portion of the input entirely), which may result in training the decoder to reconstruct the entire input data, including the masked portion, and may increase the robustness of the embedding(s) generated by the encoder in capturing salient information in the sensor data. In some examples, the percentage of the input data that is masked may start at zero or a small percentage and may progressively increase per batch of training or once the average reconstruction loss per batch is below a threshold loss. Ultimately, the reconstruction loss may help tune the embeddings generated by the encoder to be located in the embedding space such that the decoder is capable of distinguishing between different scenarios and accurately reproducing them.

In an example that uses ground truth data, a neural network or other encoder may determine the embedding and an object detection component may determine an object detection based at least in part on the embedding. This object detection may be generated either in a sensor data space such as in two-dimensions for an image or three-dimensions for lidar data or in the data structure space (e.g., which may include associating the object detection with voxel(s) and/or part of the exterior portion of the data structure). Ground truth data labelling portions of the sensor space or portions of the data structure, respectively, may be used to determine a loss that may be based at least in part on a difference between the ground truth data and the object detection determined by the object detection component. This loss may be backpropagated through the object detection component and the encoder, altering parameter(s) thereof, to reduce the loss according to gradient descent. The object detection component may be removed after training is complete, e.g., when the average loss of the last n losses is below a threshold loss, a number of epochs or batches is complete, or the losses otherwise indicate diminishing returns, and the encoder may be used to determine the feature representation(s) discussed herein.

Either form of training may functionally result in training the encoder to generate an embedding (i.e., feature representation) that is located within an embedding space that differentiates the input sensor data from other sensor data of a same or different type. An embedding may include a vector or tensor representation of the input data in a high-dimensional space called an embedding space, although the dimensionality of that space may be lower than the original input data. Note that this embedding space may be high-dimensional compared to two- or three-dimensions (e.g., hundreds of dimensions or thousands of dimensions), but may have less or even far less dimensions than the input data, which may number in the thousands or millions of dimensions. With training, an encoder differentiates between data by locating embeddings at different locations in the embedding space to signify their relative similarities, differences, attributes, etc.

In some examples, the machine-learned model may comprise a transformer-based encoder that may apply self-attention to a single type of sensor data or an encoder that applies cross-attention between multiple types of sensor data to determine the feature representation. The encoder may also determine a set of preliminary embeddings using a first type of sensor data by applying one or more layers of self-attention to the first sensor data and may generate a set of (final) embeddings by applying cross-attention between the set of preliminary embeddings and a set of preliminary embeddings associated with a different type of sensor data. In some examples, generating the set of (final) embeddings may comprise an iterative process of self-attention on the last set of preliminary perception embeddings and cross-attending the resulting self-attended preliminary embeddings with embeddings generated for other sensor data and repeating using the cross-attended result. See U.S. patent application Ser. No. 18/304,975, filed Apr. 21, 2023 and U.S. patent application Ser. No. 18/127,480, filed Mar. 28, 2023, the entireties of which is incorporated herein for all purposes, for examples of self-attention and cross-attention.

In some examples, the techniques described herein may comprise other machine-learned model(s) for determining a depth estimate associated with sensor data, which may include computer vision machine-learned model(s) such as a neural network (e.g., U-net), vision-based transformer (e.g., ViT), or the like; machine-learned model(s) for aggregating feature representation(s) for a particular voxel or for a part of the exterior portion of the data structure (e.g., a neural network, multi-layer perceptron, transformer-based machine-learned model), and/or others.

In some examples, further training may be conducted on the encoder(s) for generating the feature representation(s) and the subsequent machine-learned model(s), such as the machine-learned model(s) for determining a depth estimate, object detection and/or tracking component(s), machine-learned model(s) for aggregating feature representation(s), and/or the like. This further training may comprise end-to-end training or training that comprises freezing part(s) of the pipeline, such as by freezing (preventing alteration(s) to parameter(s) of) the encoder(s) as the training is conducted or for particular stages of the training. For example, all the machine-learned model(s) may be trained for the first p batches of training data, whereas for the subsequent batches particular component(s) may be frozen, where p is a positive integer. Regardless, this training may include determining a loss based at least in part on a difference between an object detection and/or track indicated in the data structure discussed herein and a ground truth object detection and/or track that indicates portions of the data structure discussed herein that are occupied by an object and/or characteristic(s) of that object (e.g., position, orientation, velocity, acceleration, classification, and/or the like at a point in time or over time). In some examples, the ground truth object data may be generated using human and/or perception component-generated labels of the data structure.

By generating the data structure, aggregated feature representation(s), and/or transformed feature representation(s) from the sensor data, the techniques discussed herein may reduce the sensitivity of the vehicle to changes in a particular sensor model used and/or to state changes in a sensor, such as sensor degradation, damage, or interference caused by environmental conditions (e.g., night, fog, electromagnetic interference). Moreover, encoding sensor pose, time sensor data was received, and/or velocity in combination with the training discussed herein embeds into the feature representation(s) a sense of space, directionality, and/or field-of-view of the sensors, allowing the cross-attention architecture to better disambiguate which feature representation(s) are related to each other. This may result in more accurate object detection and/or tracking and may enable detecting sensor anomalies. Additionally, the techniques discussed herein may improve the accuracy and smoothness of object detection and tracking, particularly for objects close enough and/or large enough to be indicated partially in two or more sensors' sensor data, which may cause multiple object detections to be generated for a single object and/or for the object detection(s) to flicker, distort, fail to be generated, or to otherwise be inaccurate. The techniques may even allow the vehicle to continue to accurately detect and track objects when one or two sensors are completely unavailable (e.g., due to tampering, degradation, or the like). The techniques may thereby increase the safety and efficacy of a vehicle that generates and uses the data structure discussed herein.

Additionally, the spatiotemporal encoding discussed herein may reduce the amount of computation and/or time it takes to train the transformer-based machine-learned model(s) discussed herein and/or may increase a maximum achievable accuracy of downstream model(s) that use output(s) of the transformer-based machine-learned model(s) discussed herein.

Example Scenario

FIG. 1 illustrates an example scenario 100 including a vehicle 102. In some examples, the example scenario 100 may be a real-world scenario. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc.

Moreover, even though the vehicle 102 is depicted as a land vehicle, vehicle 102 may be a spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a visible light camera, infrared camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

A first sensor of the sensor(s) 104 may have intrinsic parameters and/or extrinsic parameters associated therewith. In some examples, the intrinsic parameters may include parameters such as focal length, aperture, revolution rate, field-of-view, azimuth range, resolution, and/or the like. In some examples, part of the intrinsic parameters, such as the field-of-view and/or focal length may be used to determine rays associated with the first sensor, such as via ray-casting in a pre-processing operation. Such rays may be stored in memory 108. Additionally or alternatively, the first sensor may have extrinsic parameters associated therewith, such as the relative pose (i.e., position and/or orientation) of the sensor relative to a center of mass or a center of the vehicle 102. The extrinsic parameters may additionally or alternatively include a known or measured latency between sensor data capture and reception of the sensor data by another component of the vehicle 102, such as the machine-learned model(s) 116. The extrinsic parameters may be determined as part of calibrating the first sensor and/or as part of a simultaneous localization and mapping algorithm during and/or before operation of the vehicle 102. In some examples, the extrinsic parameters may be indicated as part of a transformation matrix. The transformation matrix may indicate a translation, rotation, time shift, and/or velocity shift of the sensor data received relative to coordinates associated with a center of the vehicle and/or a global or processor clock time. The transformation matrix associated with the first sensor may be used to encode the sensor's pose, time sensor data was received, and/or velocity into feature representation(s) generated for portions of sensor data generated by the first sensor associated with a ray emanating from the sensor (e.g., sensor data intersected by the ray and/or within a predefined area around the ray).

Computing device(s) 106 may comprise a memory 108 storing a perception component 110, a planning component 112, controller(s) 114, and/or machine-learned model(s) 116. Note that, in some examples, the computing device(s) 106 may additionally or alternatively store a prediction component, map data, logging component, and/or localization component. The prediction component may be part of the perception component 110 and it may determine a predicted position, orientation, velocity, acceleration, and/or other state (e.g., aperture state, blinker state) associated with an object. The logging component may store log data and/or periodically transmit the log data to a remote computing device (illustrated in FIG. 7). The log data may be based at least in part on sensor data received at an autonomous vehicle, perception data generated by a perception component, and/or instructions generated by a planning component. In some examples, at least part of the log data may be used as ground truth data for training the models discussed herein (e.g., perception component outputs may be used as a ground truth label, raw sensor data may be used to determine reconstruction loss, raw sensor data may be altered to train a sensor anomaly detection component). The localization component may comprise software and/or hardware system(s) for determining a pose (e.g., position and/or orientation) of the vehicle 102 relative to one or more coordinate frames (e.g., relative to the environment, relative to a body of the vehicle, relative to a roadway and/or static object(s) indicated in map data, relative to an inertial direction of movement associated with the autonomous vehicle). The localization component may output at least part of this data to the perception component 110, which may output at least some of the localization data and/or use the localization data as a reference for determining at least some of the perception data. In some examples, the perception data may include the localization data and/or the prediction data. In some examples, the sensor anomaly detection component may be part of the perception component 110 or the localization component.

In general, the perception component 110 may determine what is in the environment surrounding the vehicle 102 and the planning component 112 may determine how to operate the vehicle 102 according to information received from the localization component and/or the perception component 110. The prediction component, the localization component, the perception component 110, and/or the planning component 112 may include one or more machine-learned (ML) models and/or other computer-executable instructions.

In some examples, the localization component and/or the perception component 110 may receive sensor data from the sensor(s) 104. In some examples, the localization component and/or perception component 110 may comprise a pipeline of hardware and/or software, which may include one or more GPU(s), ML model(s), Kalman filter(s), and/or the like. In some instances, the perception component 110 may determine data related to objects in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), map data that identifies characteristics detected in proximity to the vehicle (e.g., locations and/or dimensions of the roadway, roadway classification(s) (e.g., directionality associated with a portion of the roadway, crosswalk locations, controlled intersection type, signage type and location), buildings, trees, fences, fire hydrants, and any other feature detectable in various sensor modalities), etc.

The perception component 110 may use the sensor data discussed herein to generate the feature representations and/or data structure discussed herein. For example, the perception component 110 may use image data (e.g., visible light data, infrared data), lidar data, radar data, and/or the like to generate the feature representations and/or data structure. The depicted example includes a depiction of the relative image planes of a set of images 118 received by the vehicle 102 from a set of cameras. One or more of these images 118 may comprise an image representation 120 of a pedestrian 122 in an environment associated with the vehicle 102. In some examples, the perception component 110 may additionally or alternatively receive lidar data 124, radar data, and/or any other types of sensor data associated with the pedestrian 122. The perception component 110 may use any of this sensor data and additional or alternate sensor data as part of generating at least part of the data structure discussed herein. The perception component 110 may then use the feature representations and/or data structure to determine an object detection associated with the pedestrian, track the pedestrian over time, and/or predict future object data related to the pedestrian. Additionally or alternatively, the perception component 110 may detect a sensor anomaly associated with a sensor using the feature representations and/or data structure discussed herein.

When a perception component 110 detects an object (e.g., using the data structure discussed herein), the perception component 110 may generate an object detection, which may comprise a further data structure indicating one or more characteristics of the object. For example, the object detection may indicate a region of interest (ROI) associated with the object detection (e.g., a bounding box, mask, or other indication of a portion of sensor data associated with the object); instance segmentation; semantic segmentation; a volume or area occupied by the object; a pose (e.g., position and/or orientation); velocity; acceleration; classification (e.g., vehicle, pedestrian, articulating vehicle, signage); track; confidence score(s) that any such data is accurate; other state (e.g., signage state, such as traffic light state, lane closure state; aperture/door state; passenger loading/unloading object; passenger embarking/disembarking; blinker/emitter state); etc. associated with the object. The perception component 110 may associate an object detection with a track, which may indicate that the object has been previously detected and may comprise historical perception data and/or predicted perception data associated with the object. For example, the track may associate one or more object detections associated with a same object but different times. In some examples, the object track may indicate a current, historical, and/or predicted position, orientation, velocity, acceleration, and/or other state or object detection data (e.g., classification, ROI, confidence score(s)) associated with an object.

In some examples, the perception component 110 may comprise a prediction component that determines predicted data associated with an object, such as a predicted future position, orientation, velocity, acceleration, state, or the like. This predicted data and/or historical data associated with an object may be amalgamated with the current object detection data as a track in association with the object. In some examples, the prediction data may be additionally or alternatively based at least in part on map data or other data. In some examples, the prediction data may comprise a top-down segmentation of the environment, as described in more detail in U.S. Pat. No. 10,649,459, filed Apr. 26, 2018, which is incorporated by reference in its entirety for all purposes herein, and/or a top-down prediction associated with the environment, as described in more detail in U.S. Patent Application Publication No. 2021-0181758, filed Jan. 31, 2020, which is incorporated by reference in its entirety for all purposes herein. In some examples, the prediction data generated by such a prediction component may be part of the perception data.

Additionally or alternatively, the prediction data may be indicated in the data structure, transformed feature representation(s), and/or aggregated feature representation(s) discussed herein, either by appending the prediction data to relevant feature representation(s) (e.g., the rays thereof that intersect a portion of the environment predicted as being occupied in the future) and/or portion(s) of the data structure (e.g., rays thereof that intersect the portion of the environment predicted as being occupied in the future and that intersect the portion(s) of the data structure), or by determining feature representation(s) for the prediction data and concatenating, summing, or determining updated feature representation(s) by a machine-learned model and based at least in part on the former feature representation(s) and the feature representation(s) determined for the prediction data.

The data produced by the perception component 110 may be collectively referred to as "perception data." In some examples, the data structure may be part of the perception data and, in additional or alternate examples, the data structure may comprise object detection(s), track(s), and/or prediction data. In some examples, the perception component 110 may additionally or alternatively indicate a time and/or location associated with the data structure discussed herein, an object detection, and/or other perception data. In some examples, the time associated with an object detection and/or the data structure may be a time or average time at which sensor data used to determine the object detection was generated and a location associated with an object detection may be the position the object is detected as being located at, a center of an ROI associated with the object, or the like.

Once the perception component 110 has generated perception data, the perception component 110 may provide the perception data to the planning component 112. Regardless, in some examples, the data structure may also be provided to the planning component 112. Additionally or alternatively, the perception data may be stored as part of log data transmitted to a remote computing device by a logging component.

The planning component 112 may determine a trajectory 126 based at least in part on the perception data. For example, the planning component 112 may determine a route for the vehicle 102 from a first location to a second location; generate, substantially simultaneously and based at least in part on the perception data, a plurality of candidate trajectories for controlling motion of the vehicle 102 in accordance with a receding horizon technique (e.g., 1 microsecond, half a second, 4 seconds, 8 seconds, and the like) to control the vehicle to traverse the route (e.g., in order to avoid any of the detected objects); and select one or more of the candidate trajectories as a trajectory 126 that the vehicle 102 may use to generate a drive control signal that may be transmitted to drive components of the vehicle 102. In some examples, the trajectory 126 may be part of a series of trajectories determined by a tree search conducted by the planning component 112 based at least in part on the sensor data, perception data, prediction data, map data, and/or data structure discussed herein, as discussed in more detail in U.S. Pat. No. 11,932,282, filed Aug. 4, 2021 and/or U.S. patent application Ser. No. 18/540,642, filed Dec. 14, 2023, the entireties of which is incorporated by reference herein for all purposes. FIG. 1 depicts an example of such a trajectory 126, represented as an arrow indicating a heading, velocity, and/or acceleration, although the trajectory itself may comprise instructions for controller(s) 114, which may, in turn, actuate a drive system of the vehicle 102.

For example, the planning component 112 may determine a route from a first location to a second location based at least in part on a set an intersection and/or roadway whitelist and/or blacklist. The route may identify the roadway(s), intersection(s), and/or lane(s) that the vehicle may plan to use to reach the second location from the first location. The tree search may iteratively determine different candidate actions as candidates for controlling the vehicle for each time period of a series of time periods. The prediction component (e.g., of the perception component) may determine at least a portion of a predicted trajectory for an object in the environment based at least in part on such a candidate action and the tree search may select a first candidate action associated with a first time period to use to explore further candidate actions stemming from the first candidate action at a second time period, as discussed in more detail in U.S. patent application Ser. No. 18/540,642, filed Dec. 14, 2023, referenced above. In some examples, the portion of the predicted trajectory may comprise a response of the object to the candidate action since some candidate actions for controlling the vehicle may affect an operation of the object. In some examples, a cost may be determined by a cost function for each candidate action based at least in part on the predicted trajectory of the object. The prediction component may update the predicted trajectory and/or add a new portion to the predicted trajectory of an object that was determined for the first candidate action based at least in part on one of the candidate actions determined for the second time step. The tree search may repeat this process until a time horizon, distance, or target pose is achieved by the tree search. The tree search may also account for objects classified by the perception component 110 as not being relevant to operation planning by the vehicle (e.g., a machine-learned model may have generated a likelihood of such object(s) changing their behavior responsive to a candidate action of the vehicle that is below a likelihood threshold), but may use a passive prediction for those objects. In some examples, the passive prediction may be determined by the tree search using a kinematics model or neural network. However, such a passive prediction would not be based on the candidate action(s) of the vehicle.

In some examples, the machine-learned model(s) 116 discussed herein may comprise encoder(s) for determining the feature representation(s) discussed herein, machine-learned model(s) for determining aggregated feature representation(s) using feature representation(s) and/or transformed feature representation(s) as input, machine-learned model(s) for determining amalgamated feature representation(s) for populating the data structure discussed herein, and/or computer vision machine-learned model(s) for determining a depth estimate and/or probability distribution associated with a portion of sensor data, such as a pixel, voxel, or context window/context volume of sensor data.

FIG. 1 depicts an example of a trajectory 126, represented as an arrow indicating a position, heading, velocity, and/or acceleration, although the trajectory itself may comprise instructions for a controller, which may, in turn, actuate a drive system of the vehicle 102. For example, the trajectory 126 may comprise instructions for controller(s) 114 of the autonomous vehicle 102 to actuate drive components of the vehicle 102 to effectuate a steering angle and/or steering rate, which may result in a vehicle position, vehicle orientation, vehicle velocity, and/or vehicle acceleration. The trajectory 126 may comprise a target heading, target steering angle, target steering rate, target position, target velocity, and/or target acceleration for the controller(s) to track over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the controller(s) 114 may comprise software and/or hardware for actuating drive components of the vehicle 102 sufficient to track the trajectory 126. For example, the controller(s) 114 may comprise one or more proportional-integral-derivative (PID), linear quadratic regulator (LQR), model predictive control (MPC), and/or other controller(s) to control vehicle 102 to track trajectory 126.

Example Data Structures

Figure 2A:
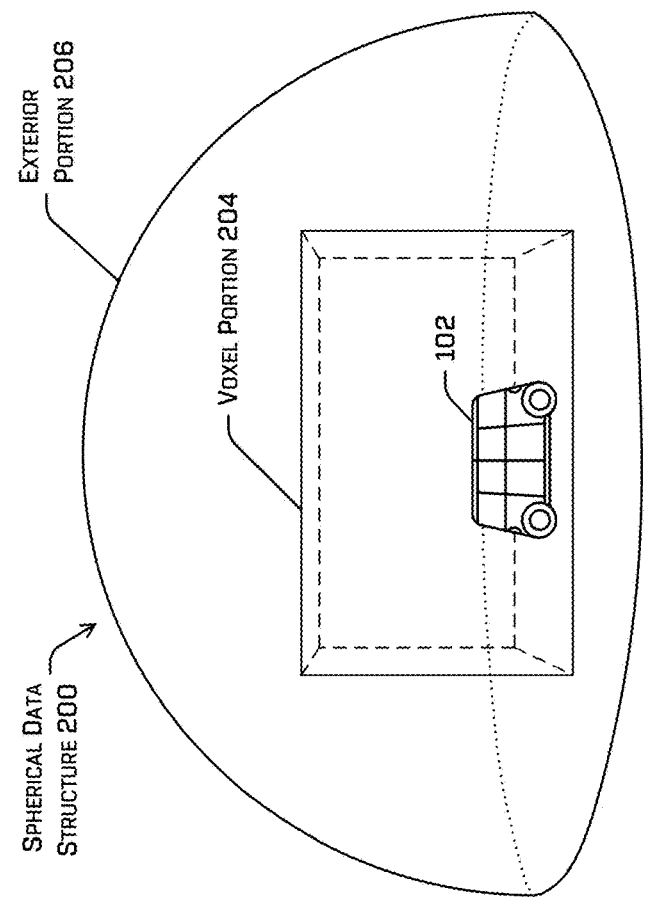
FIG. 2A illustrates a representative architecture of an example spherical data structure for fusing sensor data received from two or more sensors, the example spherical data structure comprising a voxel grid portion and a spherical exterior portion.
Figure 2B:
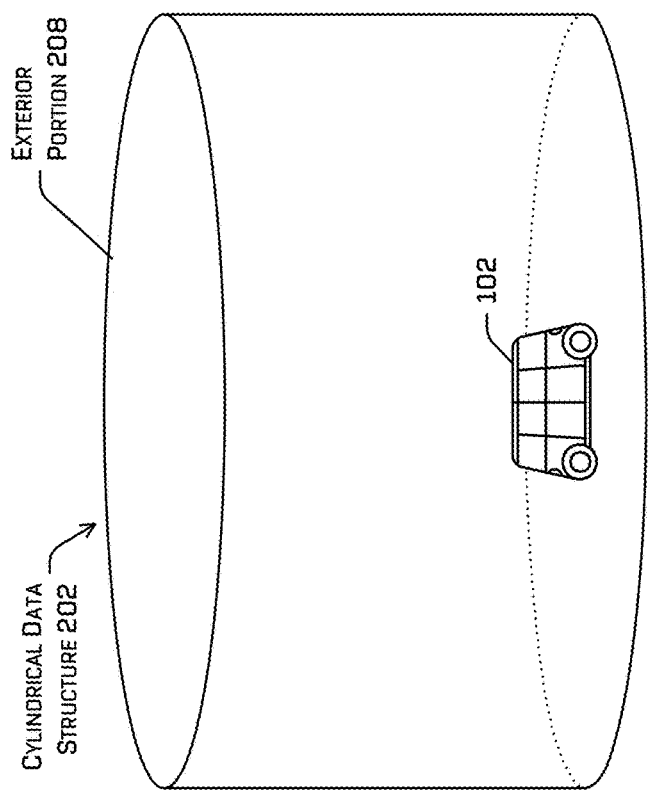
FIG. 2B illustrates a representative architecture of an example cylindrical data structure for fusing sensor data received from two or more sensors, the example cylindrical data structure comprising a voxel grid portion and a cylindrical exterior portion.

FIG. 2A illustrates a representative architecture of an example spherical data structure 200 for fusing sensor data received from two or more sensors, the example spherical data structure comprising a voxel grid portion and a spherical exterior portion. FIG. 2B illustrates a representative architecture of an example cylindrical data structure 202 for fusing sensor data received from two or more sensors, the example cylindrical data structure comprising a cylindrical exterior portion.

Either, both, or neither of the depicted data structure architectures and any other potential data structures using differently shaped exterior portions may comprise a voxel portion 204. The voxel portion 204 may comprise a voxel grid having a volume defined by a square, rectangle, polygon, or the like and having boundaries containing voxels. For example, the voxel grid's volume may be bounded by cuboid having sides that are 50 or 75 meters from the front, back, and sides of the vehicle and that extends 10 meters above a ground plane determined by the vehicle or as indicated by map data. Note that FIGS. 2A and 2B not to scale, but that they depict boundaries of the vehicle grid as a cuboid. Further note that these dimensions are merely given as examples and any other dimensions could be used. The voxel grid may comprise a plurality of voxels (not depicted so that vehicle 102 is visible in the illustration), where a voxel may indicate a portion of space around the vehicle that is contained by the voxel grid. For example, a voxel may have dimensions defining a cube, cuboid, triangular prism, square-based pyramid, tetrahedron, or the like portion of the voxel grid and a corresponding portion of the environment surrounding the vehicle. The size of each voxel may be defined by a known uncertainty associated with lidar and/or radar data or may be used to down sample the sensor data discussed herein.

Beyond the voxel portion 204, the data structure may indicate feature representations of sensor data using an exterior portion, which may be defined by a spherical, cylindrical, triangular, square-based pyramidal, tetrahedral, or the like coordinate system associated therewith. For example, FIG. 2A depicts a spherical exterior portion 206 where a feature representation associated with part of the spherical exterior portion may be associated with polar coordinates or a range of polar coordinates and FIG. 2B depicts a cylindrical exterior portion 208 where a feature representation with part of the cylindrical exterior portion may be associated with cylindrical coordinates or a range of cylindrical coordinates. In some examples, although the exterior portion 206 of the spherical data structure 200 and the exterior portion 208 of the cylindrical data structure 202 are depicted using a constant radius, the radius may be infinite or undefined i.e., the exterior portion of any data structure may indicate a feature representation for any data in a particular direction, regardless of how far away from the sensor position any object(s) are that are indicated in the sensor data. Additionally or alternatively, the exterior portion of the data structure discussed herein may have a constant radius. For example, the radius may be defined to be a distance that meets or exceeds a maximum range of a sensor, such as the type of sensor having a longest range from among multiple sensor types.

As discussed further herein, a feature representation may be determined for a voxel of the voxel portion 204 based at least in part on sensor data that is within a threshold distance of a ray that intersects the voxel. Determining this feature representation may comprise determining a final feature representation from multiple feature representations generated for different types of sensor data (e.g., image, lidar, and radar to give a non-limiting example), feature representations for other voxels near enough the voxel that the voxel is included in a set of voxels with which a feature representation is to be associated, and/or the like. Determining the feature representation for a part of the exterior portion, such as a pixel or other region of the data structure, may comprise determining feature representation(s) of a voxel or other portion of sensor that are within a threshold distance of a ray intersecting the part of the exterior portion. These feature representations may be aggregated according to the techniques discussed herein.

Figure 2C:
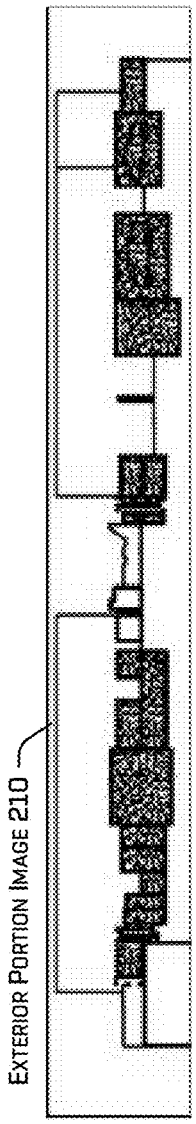
FIG. 2C illustrates an example of unfolded image data from a cylindrical exterior portion.

FIG. 2C illustrates an example of unfolded image data from a cylindrical exterior portion of the cylindrical data structure 202. In some examples, the exterior portion may be represented as an image (i.e., exterior portion image 210), where a pixel or a group of pixels stores an aggregated feature representation determined from feature representation(s) of the voxel grid and/or feature representation(s) determined for sensor data outside the voxel grid (or for which no depth estimate was determined, available, or used) that are within a threshold distance of one or more rays that intersect the part of the exterior portion. Although exterior portion image 210 appears to depict a somewhat humanly recognizable pattern depicting an environment, the feature representations discussed herein may comprise embedding(s) and, as such, the resultant image is not a traditional RGB or grayscale, image, since a pixel or group of pixels may indicate one or more embeddings. Note that an image of the cylindrical data structure 202 was easiest to depict as an image, but that the exterior portion 206 of the spherical data structure may similarly be represented by projecting the sphere into a two-dimensional space. Additionally or alternatively, if the sphere is to be projected into a two-dimensional rectangle, some portions of the resultant image may indicate nonce data (e.g., zero, empty) to indicate portions that are not included in the sphere.

Figure 3:
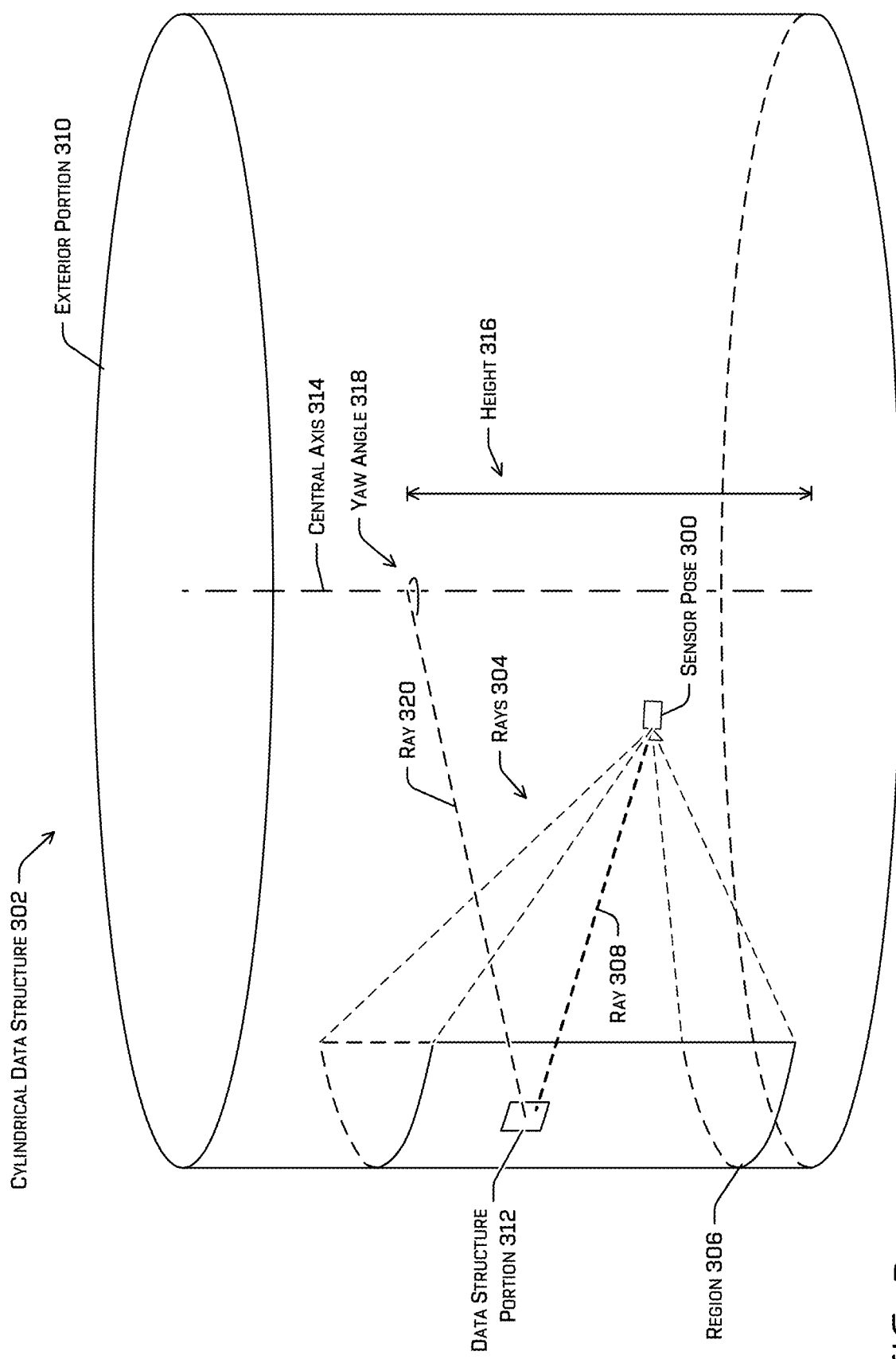
FIG. 3 illustrates an example of ray-tracing to determine rays associated with a sensor.

Example Ray Tracing Technique for Generating an Exterior Portion of the Data Structure FIG. 3 illustrates a representative architecture of a data structure discussed herein and a depiction of an example process for pre-generating ray(s) associated with a sensor, e.g., via ray-casting. The example architecture of the data structure include an example cylindrical data structure 302 comprising a cylindrical exterior portion 310, which may be an image having pixels (or other portions) referenced by discrete coordinates or ranges of coordinates. In some examples, although the exterior portion 310 is depicted as having a constant radius, the radius may be infinite or undefined i.e., the exterior portion of any data structure may indicate a feature representation for any data in a particular direction, regardless of how far away from the sensor position any object(s) are that are indicated in the sensor data. Accordingly, the image that stores the feature representations discussed herein may be defined according two of three potential dimensions (e.g., yaw angle and height without specifying radius, yaw angle and pitch angle without specifying radius).

In some examples, generating the data structure discussed herein, regardless of the shape and/or coordinate system of the exterior portion, may comprising generating a set of rays for up to each sensor associated with the vehicle. Generating the set of rays for a sensor may comprise ray tracing bounded by a sensor frustrum of a sensor and based at least in part on a sensor pose 300 of the sensor, which may indicate a position and/or orientation of the sensor. For example, FIG. 3 illustrates rays 304 (illustrated as dashed lines emanating from the sensor pose 300) that may be generated based at least in part on ray tracing using the sensor pose 300 and characteristics of the sensor, including a frustum of the sensor to bound a yaw range and height range (for a cylindrical coordinate system) or yaw range and pitch range (for a spherical coordinate system). In the illustration, the depicted sensor may be a camera having a rectangular-based frustum, as indicated by the rectangular region 306 (considered rectangular based on a rectangular frustum's projection into the cylindrical space) projected onto the cylindrical exterior portion 310 of the data structure onto which an image received from the camera can be mapped at its boundaries. The rays 304 include rays that may be associated with different maximal extents of the bounds of the frustum of the depicted sensor and a ray 308 that is somewhere in between the range of coordinates associated with the sensor's frustum.

Although FIG. 3 depicts five rays (one associated with each corner of the frustum and one example ray 308) for clarity of the drawing, any number of rays or density of rays (rays per square meter, for example) may be ray traced within the frustum of the sensor and originating from the pose of the sensor. A ray, such as ray 308, may be used to determine a subset of sensor data received by the sensor for which the ray 308 was generated and associated with the ray 308. For example, the subset of sensor data may comprise sensor data generated by the sensor that is intersected by the ray 308 or within a threshold distance orthogonal to the ray (e.g., within a predefined region around the ray, which may be conical, pyramidal). A machine-learned model may use the subset of sensor data to determine a feature representation for the ray. For example, the machine-learned model may be an encoder model and the feature representation may be an encoding of the subset of sensor data. Such a feature representation may be encoded by a transformation matrix associated with the sensor pose 300, a time at which the sensor data was received, and/or a velocity indicated by the sensor data or a velocity of the sensor. Such a transformed (encoded) feature representation may be used to determine an aggregated feature representation associated with the ray by cross-attending the transformed feature representation with feature representations associated with other ray(s) of the same sensor and/or ray(s) from other sensor(s). The transformed feature representations and/or the aggregated feature representations may be used to populate the exterior portion 310 of the data structure. For example, a transformed feature representation and/or aggregated feature representation determined for sensor data intersected by ray 308 or within a threshold distance of ray 308 (e.g., 10 centimeters, 1 meter tangent to the ray) may be used to populate the data structure portion 312 since ray 308 intersects the data structure portion 310. In such an example, a portion of the data structure may indicate feature representation(s) (i.e., an amalgamated feature representation determined from any aggregated feature representations of ray(s) that intersect the portion of the data structure) associated with a height range and a yaw angle range (in a cylindrical example), a pitch angle range and a yaw angle range (in a spherical example), and/or the like of a data structure centered at a center of mass or center of the vehicle.

The data structure portion 312 may be a pixel, group of pixels, or other region of the exterior portion 310. In some examples, the data structure portion 312 may be defined by a yaw angle and height (for a pixel of cylindrical data structure) or a range of yaw angles and range of heights (for a group of pixels or a region of a cylindrical exterior portion), or a yaw angle and pitch angle (for a pixel of a spherical data structure) or a yaw angle range and pitch angle range (for a group of pixels or region of a spherical data structure). Additionally or alternatively, the data structure may be generated with reference to an origin defined at a center of mass or center of the vehicle. For example, FIG. 3 depicts a central axis 314 of the example cylindrical data structure 302. The data structure portions may be defined by relative to this coordinate frame. For example, the data structure portion 312 may be defined to be at a height 316 and yaw angle 318 with reference to a reference location and/or orientation associated with the vehicle. This height 316 and yaw angle 318 may define a ray 320. The data structure portion 310 may be defined to be a range of heights and and/or range of yaw angles centered at the ray 320 (in a cylindrical data structure example), although other permutations are contemplated (e.g., defining the data structure portion without using the ray 320, but directly as the range of heights and/or yaw angles; defining the data structure portion where the height and yaw angle of the ray defines an upper or lower bound of the height range and yaw range, instead of a center of the ranges).

Moreover, in some examples, a feature representation, transformed feature representation, and/or aggregated feature representation may be determined for the ray 320 (and/or any rays that are sensor agnostic and based on the data structure coordinates themselves). In such an instance, the feature representation determined for ray 320 may comprise a subset of sensor data intersected by or within a threshold distance orthogonal to ray 320 received from any of the sensors. The transformed feature representation of such a feature representation may indicate the data structure coordinates associated with the ray 320 as an offset from an origin/pose defining the data structure (i.e., the 0 height, 0 yaw location) instead of indicating a sensor pose transform like the other transformed feature representations.

A ray generated from the ray tracing and/or the data structure portion 312 of the exterior portion 310 that is intersected by the ray or within a threshold distance of the ray may be precomputed and transmitted to the autonomous vehicle for storage by the autonomous vehicle. In some examples, the ray tracing may be a pre-processing operation that may occur once for a particular configuration of the vehicle and that may be updated if a sensor pose is changed, the sensor anomaly detection component detects a change to the sensor pose, or capabilities of the sensor are changed that affect a frustum of the sensor (e.g., such as by changing sensor models or changing sensor parameters).

In some examples, if multiple rays intersect the data structure portion 312, the feature representations associated therewith (i.e., transformed feature representations and/or aggregated feature representations) may be amalgamated as an amalgamated feature representation and associated with the data structure portion 312. This amalgamating may comprise concatenating the feature representations, summing or averaging the feature representations, or using the feature representations as input to another machine-learned model (e.g., a MLP, KAN, transformer-based machine-learned model) that determines the amalgamated feature representation to associated with the data structure portion 312.

Example Architecture for Pre-Training Aggregating Encoder

Figure 4:
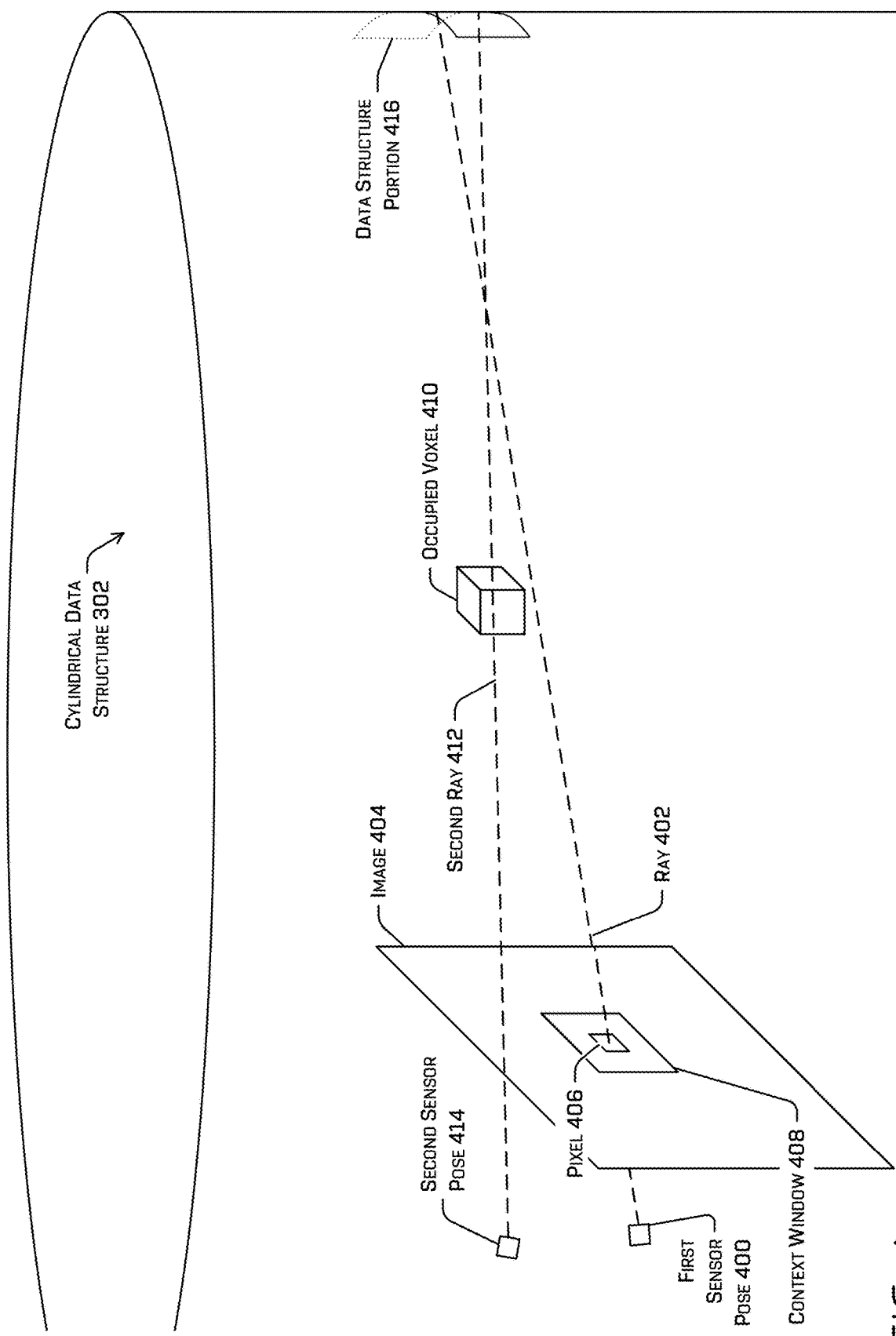
FIG. 4 illustrates a representative architecture and depiction of an example process for generating an example cylindrical data structure, the example cylindrical data structure comprising a cylindrical feature map.

FIG. 4 illustrates part of an example architecture of a data structure that may be generated according to the techniques discussed herein, and a depiction of an example process for generating part of that data structure. In some examples, the example cylindrical data structure may comprise a cylindrical feature map (e.g., functionally an image that stores embeddings instead of color data) comprising transformed feature representation(s), aggregated feature representation(s), and/or amalgamated feature representation(s) generated as discussed herein.

Generating the data structure may comprise receiving an indication of a sensor's pose, i.e., sensor pose 400 (i.e., position and orientation), and retrieving, from a memory, a ray 402 associated with the sensor pose 400 or determining the ray 402 based at least in part on a ray tracing process that may be based at least in part on the sensor pose 400 and a frustum of the sensor. In the depicted example, the sensor may be a camera that may have generated an image 404. In some examples, the sensor pose 400 may be indicated as a pose relative to a center or center of mass of the vehicle that may have been determined at calibration of the sensor, continuously updated based at least in part on simultaneous localization and mapping, and/or altered based at least in part on a change in pose detected by the sensor data anomaly detection component discussed herein. Additionally or alternatively, the sensor pose 400 may be associated with a transformation matrix that indicates the sensor pose relative to the vehicle, a time at which sensor data was received, and/or a velocity of the sensor or a velocity indicated by sensor data received by the sensor. Accordingly, at least part of the transformation matrix may dynamically be changed or different versions thereof temporally created based on the time sensor data was received, a velocity of the sensor at the time the sensor data was received, and/or a velocity indicated by the sensor data received. In such an example, a portion of the transformation matrix associated with the sensor pose may be held constant, unless the sensor data anomaly detection component indicates a correction is to be made to the sensor pose, and the other parameter(s) may be altered based on the sensor data.

In an example where the sensor is a sensor that indicates depth, such as lidar data, radar data, stereo camera data, or the like, rays may be pre-generated, but may be indicated as unit vectors indicating a direction of the ray and, at the time the sensor generates sensor data comprising a depth associated with a particular ray, the depth may further be indicated in association with the ray. This may functionally result in indicating a line that originates at the sensor's origin and terminates at the depth indicated by the sensor data in association with that ray. Additionally or alternatively, sensor data indicating depth data may be represented as a point cloud and any two-dimensional data, such as non-stereo image data, may be projected into this space as epipolar lines. Additionally or alternatively, sensor data indicating depth data may be projected into a voxel space and a voxel may contain one or more three-dimensional points. A voxel may indicate an average of the depths indicated by the three-dimensional points and/or may be indicated as being occupied if it contains more than a threshold number of three-dimensional points.

Accordingly, although the discussion so far has been simplified to discuss just rays, a feature representation may be generated for any of the geometric indications discussed herein, including ray(s), line(s), epipolar line(s), voxel(s), point(s), and/or the like. In some examples, a ray may be indicated by a unit vector (associated with an origin of the sensor associated therewith and indicating a direction of the ray) with no defined depth and a line may be indicated by a unit vector (associated with an origin of the sensor and indicating a direction of the line) and indicating a depth determined based at least in part on the sensor data. In some examples, the depth may be determined by a depth estimation model, such as the depth estimation model discussed in U.S. Pat. No. 11,062,454, filed Apr. 16, 2019, the entirety of which is incorporated by reference herein for all purposes, or may be indicated by the sensor data itself.

Although the illustrated example depicts an occupied voxel 410 that may contain one or more three-dimensional points associated with a subset of sensor data received from an object, it is understood that the three-dimensional points contained by such a voxel may additionally or alternatively be indicated by respective lines.

Generating the data structure discussed herein may comprise generating feature representation(s) for the geometric indication(s). This may comprise determining a portion of sensor data received by a sensor that is associated with the geometric indication. For example, determining the feature representation for ray 402, which is associated with an image sensor, may comprise determining a portion of the image 404 intersected by the ray 402. For example, the portion may comprise a pixel 406 and/or a context window 408 surrounding the pixel 406. In some examples, the context window may be a subset of pixels of the image 404 surrounding the pixel 406, such as pixel(s) within a predetermined rectangle or square surrounding the pixel 406. The portion of the image (e.g., the pixel 406 and/or context window 408) intersected by the ray may be used to determine a feature representation to associate with the ray.

To give another example, occupied voxel 410 may contain three-dimensional data and may be intersected by a second ray 412 from a second sensor, which may have a second sensor pose 414. In some examples, a feature representation may be determined for the second ray 412 based at least in part on any sensor data within a threshold distance of the ray, which may include at least the sensor data contained in occupied voxel 410. Additionally or alternatively, the ray may be dispensed with for sensors that indicate depth and a feature representation may be determined for the occupied voxel 410 itself.

Determining the feature representation for any of these geometric indications may comprise determining an embedding by a machine-learned model (e.g., an encoder such as a transformer-based encoder or neural network) that determine the embedding based at least in part on sensor data associated with the geometric indication. To give an example, for ray 402, this may comprise determining a first embedding (a first feature representation) by the encoder using sensor data associated with the pixel 406 and/or context window 408. For the second ray 412, this may comprise determining a second embedding by the encoder using at least the data indicated by the occupied voxel 410 and/or any sensor data generated by the second sensor data that is intersected by and/or within a threshold distance of the second ray 412. The techniques may additionally or alternatively comprise determining a third embedding by the encoder using any sensor data generated by the second sensor contained in the occupied voxel 410. However, in some examples, feature representations may be generated for rays and lines exclusively, and may instead use voxels to down-sample three-dimensional data, such as by determining a feature representation for the second ray 412 based at least in part on an average distance indicated by three-dimensional points generated by the second sensor and contained within the occupied voxel 410.

Once feature representations have been generated for the geometric indications (e.g., the ray(s), voxel(s), line(s), point(s), and/or the like associated with each sensor), the techniques discussed herein may comprise determining transformed feature representation(s) and aggregated feature representations, as discussed in further detail regarding FIGS. 5A and 5B. As discussed further herein, a transformed feature representation may be generated by encoding the feature representation associated with a particular sensor using a transformation matrix indicating that sensor's relative pose and a time at which the sensor data used to generate the feature representation was received. Additionally or alternatively, the transformation matrix (and the resultant encoding/transformation) may indicate a velocity of the sensor or a velocity indicated by the sensor data, such as for radar data, some lidar data with pre-processing to determine a velocity of an object, and/or the like. For example, the feature representation determined for ray 402 may be transformed according to the discussion in FIG. 5B using a transformation matrix determined for the sensor pose 400 and a time at which the image 404 was received.

Once the feature representations for the different sensors have been encoded using the transformation matrices associated with the different sensors, the resultant transformed feature representations may be used in a transformer-based machine-learned model (e.g., using cross-attention) to determine aggregated feature representations for the geometric indications. For example, the transformed feature representation associated with ray 402 may be cross-attended with all the other transformed feature representations determined for the other geometric indications or may be cross-attended with a subset of the transformed feature representations, as determined by the spatial filter, as discussed in more detail regarding FIG. 5A. The transformer-based machine-learned model may comprise one or more blocks of cross-attention component(s) and/or feed-forward neural network(s), the last of which may output the aggregated feature representation that may be associated with ray 402.

In some examples, the techniques may comprise determining a feature to populate a data structure portion 416 based at least in part on determining a subset of rays that intersect the data structure portion. The data structure portion 416 may comprise a pixel, group of pixels, or any other region of the data structure, e.g., as may be defined by a range of coordinates relative to an origin referencing a pose of the vehicle (e.g., a position and orientation of a center of the vehicle). For example, the depicted data structure portion 416 may be a height range (e.g., 1.0 to 1.25 meters above a center of mass of the vehicle) and a yaw angle range (e.g., 90 degrees to 112.5 degrees relative to a heading of one end of the vehicle). Any geometric indication(s) that are line(s), point(s), or voxel(s) may have a ray extrapolated from the sensor data origin through the line, point, or voxel to construct the ray.

In some examples, the aggregated feature representations associated with the subset of rays that intersect the data structure portion 416 may be associated with the data structure portion 416. Associating these aggregated feature representations with the data structure may comprise determining an amalgamated feature representation to store in association with coordinates indicating the data structure portion 416 (and associated with a portion of the environment of the vehicle). Determining the amalgamated feature representation may comprise concatenating, summing, averaging, or fusing the aggregated feature representations associated with the subset of rays that intersect the data structure portion 416. In some examples, fusing the aggregated feature representations may comprise processing the aggregated feature representations using a MLP, KAN, transformer-based machine-learned model, or the like to determine the amalgamated feature representation.

This process may be repeated for up to each portion of the data structure and, depending on the ray density, voxel size (if voxels are used), and/or data structure portion size, some portions of the data structure may be left unpopulated by feature representation(s). In such an example, these may be filled with nonce data (e.g., zero, empty) or feature representations may be determined for these voxel(s) and/or part(s) by cross-attending, self-attending, or determining by a neural network or other machine-learned model a set of feature representations indicated by feature representation(s) indicated by portion(s) of the data structure within a threshold distance of the empty data structure portion or using aggregated feature representations of rays that intersect an area around the empty data structure portion defined by a padding distance added to the area of the data structure portion. In examples where some data structure portion(s) are filled with nonce data instead, the precomputation of the rays may predetermine a set of voxel(s) and/or part(s) for which no operations need to occur and this set of data structure portions may be pre-filled with nonce data to reduce computational processing.

In an example where the aggregated feature representations are used by a downstream component instead of or in addition to the data structure, the architecture discussed herein may output the ray (or other geometric indication), the aggregated feature representation generated for that ray, and a time stamp indicating a time the sensor data associated with the ray was received.

The resultant data structure and/or any of the intermediate feature representations, such as the transformed feature representations and/or the aggregated feature representations may be used by other machine-learned model(s) to determine an object detection, object track, object prediction, and/or a sensor anomaly, as discussed below in further detail. In some examples, an object detection, track, or prediction that is subsequently generated using the data structure discussed herein may be associated with the portion(s) of the data structure occupied by the object detection, track, or prediction, which may be determined by projecting the object detection, track, or prediction into the data structure, respectively. The raw object detection, track, or prediction data may additionally or alternatively be associated with the geometric indication(s) and/or data structure portion(s) onto which such data is mapped, such as by appending a pointer to a storage location or message associated with the object detection, track, or prediction, or by determining a feature representation of the object detection, track, or prediction and concatenating, summing, averaging, or fusing (by a machine-learned model as discussed above) the object detection, track, or prediction feature representation with feature representation(s) indicated by the geometric indication(s) and/or data structure portion(s) onto which the object detection, track, or prediction were mapped.

Additionally or alternatively, if the sensor data anomaly detection component detects a time shift, pose shift, or the like, the transformation matrix associated with the sensor(s) for which such a shift was detected may be altered to indicate the shifted time and/or pose.

Example Architecture and Process for Spatiotemporally Encoding Feature Data and Generating Aggregated Feature Representation(s) and/or a Data Structure FIG. 5A illustrates an example architecture 500 for generating the transformed feature representations, aggregated feature representations, and/or data structure discussed herein, which may be used by any of a number of downstream component(s), such as a perception component and/or a sensor anomaly detection component.

The example architecture 500 may comprise a first machine-learned encoder 502 that determines a feature representation 528 using a subset of sensor data received from a first sensor that is associated with a geometric indication (e.g., a ray) generated for the first sensor. For example, the geometric indication may include a ray or line emanating from an origin of the first sensor and the subset of sensor data may include a subset of sensor data received from the first sensor at a first time and that is intersected by, contained in, or within a threshold distance of the geometric indication. The first machine-learned encoder 502 may determine the feature representation 528 as an embedding (e.g., a tensor or vector) that indicates features of the subset of sensor data in an embedding space. The machine-learned encoder 502 may comprise a pre-trained transformer-based encoder (e.g., that may tokenize and/or apply self-attention to the subset of sensor data, such as bidirectional encoder representations from transformers (BERT) and/or its variants, the encoder portion of a generative pretrained transformer (GPT)), an autoencoder (e.g., a variational, sparse, convolutional, stacked, or the like autoencoder), sequence-to-sequence (Seq2Seq) model, and/or the like that generates the feature representation 528 using the subset of sensor data. In some examples, the machine-learned encoder 502 may generate feature representations for up to every geometric indication for up to every sensor of the vehicle.

In some examples, a spatial filter 504 may determine a subset of geometric indications within a threshold distance of the geometric indication for which the feature representation 528 was generated, although in some examples the spatial filter 504 may be optional/left out. In an example where the spatial filter 504 is used, the spatial filter 504 may determine a subset of feature representations that will be cross-attended with the feature representation 528 by the transformer-based machine-learned model(s). In additional or alternate examples, the spatial filter 504 may comprise a distance function that weights the cross-attention outputs determined by the transformer-based machine-learned model(s) based on a distance of geometric indications to the geometric indication for which the feature representation 528 was generated. Additionally or alternatively, the spatial filter 504 may determine the subset of geometric indications as the n nearest neighboring geometric indications, where n is a positive integer.

In some examples, the spatiotemporal encoder 506 may chunk the feature representation 528 into subsets of original feature representation data. For example, the spatiotemporal encoder 506 may break the feature representation 528 into subsets. Each subset may comprise a number of elements corresponding to a dimension of the transformation matrix associated with the sensor that generated that sensor data used to generate feature representation 528.

For example, turning to FIG. 5B, the original feature representation 518 (which may be an example of feature representation 528) is depicted as a set of values, $\{x_1, \ldots, x_n\}$ where n is the number of dimensions of the feature representation. If the transformation matrix (i.e., projection matrix) associated with the sensor that generated the original feature representation 518 is a 4×4 matrix, the spatiotemporal encoder 506 may chunk the original feature representation 518 into subsets comprising four elements of the original feature representation 518. For example, a first subset may comprise $\{x_1, x_2, x_3, x_4\}$, a second subset may comprise $\{x_5, x_6, x_7, x_8\}$, and so on until the n-th element of the original feature representation 518 has been included in a subset. In an example where n is not divisible by the number of elements in a subset into a multiple of the number of elements in a subset, the last subset may be padded with zeroes or the like.

In some examples, the transformation matrix may comprise a projection matrix that indicates the mapping of the sensor pose to a reference pose of the vehicle and/or data structure, a time to a reference time (e.g., a clock time of the vehicle, a global time), and/or a velocity of the sensor or an object indicated by the sensor data. For example, in an example where the data structure is a Cartesian grid and the transformation matrix only indicates the relative pose (i.e., position and orientation) of the sensor relative to a pose of the vehicle/data structure, the transformation matrix may be a 4×4 matrix as follows:

$$\begin{matrix} r_{11} & r_{12} & r_{13} & x \\ r_{21} & r_{22} & r_{23} & y \\ r_{31} & r_{32} & r_{33} & z \\ 0 & 0 & 0 & 1 \end{matrix} \quad (1)$$

where the top 3×3 portion of r values indicates the relative rotation of the sensor and the x, y, and z values indicate the translation of the sensor position in the x-, y-, and z-directions. However, to additionally encode the time at which the sensor data was received, a 4×4 matrix may still be used and either the last row of the last column may be updated to indicate an offset of the time the sensor data was received to a reference time (e.g., a time the vehicle started up, the last periodic tick of an onboard processor clock or global clock (e.g., tick of processor every second or two seconds, tick of global clock). For example, such a matrix may be given by $$\begin{matrix} r_{11} & r_{12} & r_{13} & x \\ r_{21} & r_{22} & r_{23} & y \\ r_{31} & r_{32} & r_{33} & z \\ 0 & 0 & 0 & t \end{matrix} \quad (2)$$

where t indicates the time offset at which the sensor data was received. This method treats t as a positional translation, which may be adequate. However, the transformation matrix may additionally or alternatively be expanded to a 5×5 matrix where the last column encodes time, which may capture linear interactions between sensor(s) and detected objects and movements of the vehicle:

$$\begin{pmatrix} r_{11} & r_{12} & r_{13} & x & t_1 \\ r_{21} & r_{22} & r_{23} & y & t_2 \\ r_{31} & r_{32} & r_{33} & z & t_3 \\ 0 & 0 & 0 & 1 & 1 \\ 0 & 0 & 0 & 1 & 1 \end{pmatrix} \quad (3)$$

where the t values encode the relative time and may additionally or alternatively be used to implicitly indicate velocity indicated by the sensor data or a velocity of the sensor itself. In an additional or alternate example, a 4×4 transformation matrix may be used, but to encode the time and/or velocity a machine-learned model, such as a MLP, neural network, or KAN may determine the transformation matrix dynamically, as a function of time. Such a machine-learned model may be part of the spatiotemporal encoder and may be trained to receive the transform, global time and/or sensor data received time, and contextual sensor data to output a 4×4 transformation matrix where the values of the original 4×4 transformation matrix indicating sensor pose have been altered to implicitly indicate time and/or velocity. This method may allow the transformation matrix to capture nonlinear behavior of objects and/or motion of the vehicle. In some examples, the contextual data may comprise velocity data indicated by the sensor itself or indicated by another sensor of the vehicle, such as wheel encoder information, gyroscope output, and/or the like (e.g., which may be pre-processed using the original transformation matrix to determine a relative velocity of the sensor). Such a machine-learned model may be trained to parameterize the sensor movement as a matrix Lie algebra where the machine-learned model functionally operates to optimize a Lie group transformation to the matrix Lie algebra.

It will be understood that the size of the chunks (i.e., the number of values in the subsets of the feature representation that are to be transformed) will depend on the dimensions of the matrix and which implementation is used.

Functionally, the spatiotemporal encoder 506 may treat each of these subsets as if they are coordinates in a pose-time(-and/or velocity) space even though they're just elements of the original feature representation 518. For example, FIG. 5B depicts a portion 520 of the original feature representation 518 that the spatiotemporal encoder 506 treats as a location in a space-time having an x-, y-, z-, and t-(time) coordinate indicated by $x_1$, $x_2$, $x_3$, and $x_4$, respectively. Note that the transformation matrix will dictate the dimension of the space the subset is treated as indicated. In the depicted example, the space is four-dimensional, although the space could be lower or higher (e.g., to further indicate orientation, velocity, or the like).

The spatiotemporal encoder 506 may encode the sensor pose, the time at which the sensor data used to generate the original feature representation 518 was received, and/or the velocity of the sensor or a velocity indicated by the sensor data used to generate the original feature representation 518 by multiplying the subset (e.g., portion 520) of the original feature representation by the transformation matrix associated with the sensor. This transformation is illustrated as transformation 522 (illustrated in a dashed line) and will result in a transformed portion 524 of the original feature representation, $\{x'_1, x'_2, x'_3, x'_4\}$. The remaining subsets may also be multiplied by the transformation matrix associated with the sensor data and the resulting transformed portions may be concatenated together to form the transformed feature representation 526, $\{x'_1, \ldots, x'_n\}$, which may be represented as transformed feature representation 530 in FIG. 5A.

This process may be repeated for up to all the feature representations generated for geometric indications associated with a sensor and/or for up to all the feature representations generated for other sensor(s). Accordingly, since the transformation matrices for the different sensors may indicate different pose(s), time(s) at which their respective sensor data was received, and/or velocity(ies), the resultant transformed feature representations implicitly encode rich information about the relationships between the geometric indications (e.g., rays, lines), differences in times at which sensor data was received, differences in velocities of different sensors, and/or differences in velocities indicated by different sensor data (when it's available). This may reduce the amount of computation and/or time it takes to train the transformer-based machine-learned model(s) discussed herein and/or may increase a maximum achievable accuracy of downstream model(s) that use output(s) of the transformer-based machine-learned model(s) discussed herein. Intuitively, this may be the case because during training of the transformer-based machine-learned model(s), the transformer-based machine-learned model(s) may need less or no parameter alteration(s)/formation of connections to model the spatiotemporal relations between the sensor(s). In other words, this information may already be implicitly encoded in the queries, keys, and/or values used by the transformer-based machine-learned model(s) and training may result in tuning parameter(s) that encode other relationships in sensor data.

Returning to FIG. 5A, the example architecture 500 may comprise a first block type or a second block type. In the first block type, the transformed feature representation 530 may be cross-attended, by transformer-based machine-learned model 508, with other transformed feature representations to determine an aggregated feature representation associated with the geometric indication for which the feature representation 528 was generated. In some examples, the transformer-based machine-learned model 508 may further comprise a feed-forward neural network or another output head type that uses a cross-attention output to generate the aggregated feature embedding.

In the second block type, the block type may include a transformer-based machine-learned model 508 of the first block type that generates a first preliminary embedding and, additionally, the original (untransformed) feature representation 528 may be cross-attended, by a transformer-based machine-learned model 510, with other (untransformed) feature representations to generate a second preliminary embedding. In an example using the second block type, the first preliminary embedding and the second preliminary embedding may be processed by a feed-forward neural network (or an equivalent) to generate the aggreged feature representation associated with the geometric indication for which the feature representation 528 was generated.

Either way, regardless of the block type used, the architecture 500 may comprise one or more blocks of either block type, although for the sake of space, FIG. 5A merely depicts a single block of the second block type. In a single block type, transformer-based machine-learned model 510 would be removed.

Either transformer-based machine-learned model may use the feature representation (transformed or untransformed, respectively) associated with the geometric indication for which an aggregated feature representation is to be generated as a query vector. The feature representation(s) of the other geometric indications may be used as key vector(s) and/or value vector(s). In some examples, the transformer-based machine-learned model may additionally or alternatively comprise a further set of encoders that determine intermediate embeddings from the input feature representations to determine the query, key, and value vectors (e.g., such an encoder may comprise a multi-head self-attention component and/or feed-forward neural network). In some examples, the queries (e.g., copies of the feature representation or intermediate embeddings generated therefrom), keys, and values, may be grouped together as matrices, Q, K, and V, respectively. The respective transformer-based machine-learned model may then cross-attend such a query vector with the keys and values, such as by determining an attention matrix by multiplying or determining a dot product of the queries (multiplied first by a first trained weight matrix) by or between the keys (multiplied first by a second trained weight matrix), resulting in an attention matrix. In an example where the spatial filter is used, the attention matrix may then be masked (values set to zero where the geometric indications associated with the corresponding keys are outside a threshold distance) or weighted according to the distance function of the spatial filter. In some examples, this filtering can be done before processing with the transformer-based machine-learned model block(s).

Note that for the transformer-based machine-learned model 508, the value matrix need not be transformed via the process described in FIG. 5B. The value matrix may be based on original feature representations, at least in some examples.

The attention matrix may be processed by a softmax function and the resultant matrix may be multiplied by the value matrix or a dot product may be determined between the resultant matrix and the value matrix to determine an attention output. For all but the last transformer-based machine-learned model block, this attention output may be used as the query for the next block, and so on until the last block is reached. In some examples, the last block may further comprise a linear projection matrix (e.g., to change the dimensionality of the final attention output and which may be trained) and/or a softmax layer to determine an embedding to output. In the first block type, this embedding may be used as the aggregated feature representation; whereas, in the second block type, this embedding and the embedding generated by the other transformer-based machine-learned model block(s) may be used as input to a final feed-forward neural network that determines the aggregated feature representation. Either way, the aggregated feature representation is associated with the geometric indication for which the feature representation 528 was generated.

In some examples, this aggregated feature representation may be output directly to a perception component 514 and/or a sensor anomaly component 516. In such an example, the aggregated feature representation, the geometric indication (e.g., a ray and/or sensor location relative to the vehicle), and/or a time stamp may be output to the perception component 514 and/or the sensor anomaly component 516.

Additionally or alternatively, the architecture 500 may generate a data structure according to the techniques discussed herein where the architecture may use the aggregated feature representations determined for the geometric indications to determine amalgamated feature representations indicated by the data structure. In such an example, and as discussed above regarding FIG. 4, the architecture 500 may determine a portion of the data structure intersected by a set of geometric indications and the aggregated feature representations associated therewith. The architecture 500 may then determine an amalgamated feature representation to associated with the portion of the data structure based at least in part on such aggregated feature representations, which may comprise concatenating, summing, averaging, or fusing the feature representations via machine-learned model(s) 512 (e.g., a transformer decoder, MLP, KAN, or the like). In some examples, the geometric indications associated with a particular portion of the data structure may be previously determined in a pre-processing step and stored as a mapping of geometric indications to data structure portions in a memory of the vehicle, although any alterations to a sensor pose determined by the sensor anomaly component 516 may result in alterations to this mapping. In such an example, the alteration may be made, the geometric indications associated with that sensor may be altered (e.g., by changing a position of their origin and/or orientation), and the mapping may be updated to indicate the new set of data structure portions associated with the respective geometric indications.

Ultimately, the architecture 500 may output, in association with a geometric indication like a ray for which the feature representation 528 was generated, an aggregated feature representation associated with that geometric indication and/or an amalgamated feature representation 532, e.g., as part of a data structure and based at least in part on sensor data associated with the geometric indication for which the feature representation 528 was generated.

In some examples, the perception component 514 may use a set of aggregated feature representations and/or the data structure (comprising one or more amalgamated feature representations) to detect and/or track an object and/or predict a future state of the object. In some examples, the sensor anomaly component 516 may use a set of aggregated feature representations and/or the data structure to determine a latency associated with sensor data generated by a sensor (e.g., by determining a regressed value via an output head of the sensor anomaly component 516), that a sensor was miscalibrated (e.g., by determining, after initialization of a sensor that a time, position, and/or orientation offset exists from the calibrated time and/or pose of the sensor), that a sensor pose has changed (e.g., by determining a position offset and/or orientation offset using an output head that outputs a regressed value), and/or the like. In some examples, the sensor anomaly component 516 may comprise one or more attention blocks (e.g., self-attention and/or cross-attention) and/or one or more neural network layers. The sensor anomaly component 516 may additionally or alternatively comprise an output head that indicates a confidence score associated with the sensor anomaly, such as via a logit that may indicate a posterior probability. In some examples, the sensor anomaly component 516 may additionally or alternatively comprise a filter that only outputs any anomalies that meet or exceed a respective threshold (e.g., a sensor latency of more than 10 milliseconds, an orientation offset of more than 0.2 degrees, a position offset of more than 5 millimeters).

When the sensor anomaly component 516 detects a sensor anomaly, the sensor anomaly component 516 may alter the transformation matrix associated with the sensor for which a sensor anomaly was detected to at least one of alter the pose, time, and/or the like of the sensor, as indicated by the transformation matrix. Additionally or alternatively, the sensor anomaly component 516 may alter a calibration parameter associated with such a sensor. In some examples, an output of the sensor anomaly component 516 may be used to modify at least one of a current, historical, or predicted object position, orientation, velocity, region of interest, or the like based at least in part on a latency or pose offset determined by the sensor anomaly component 516. This may result in the vehicle altering a trajectory for controlling the autonomous vehicle.

In some examples, training the sensor anomaly component 516 may comprise shifting a time, position, or orientation associated with training sensor data by a time period, displaced position, and/or displaced orientation, respectively; and determining, by the sensor anomaly component 516 and based at least in part on aggregated feature representation(s) and/or amalgamated feature representation(s,) an estimated latency, an estimated offset distance and/or direction, and/or an estimated offset orientation. Training the sensor anomaly component 516 may comprise determining a loss by a loss function (e.g., L2 loss, Huber loss, Cauchy loss) based at least in part on a difference between the estimated latency and the time period, a difference between the estimated offset distance and/or direction and the displaced position, and/or a difference between the estimated offset orientation and the displaced orientation. These losses may be separately determined or averaged. Additionally or alternatively, the sensor anomaly component 516 may be trained in stages for different ones of the sensor anomaly types. Regardless, the loss may be used to alter one or more parameters (e.g., weights, biases, activation function definitions) of the sensor anomaly component 516 to reduce the loss(es), such as via gradient descent algorithm and/or a learning rate schedule.

Example Process for Generating and Using Spatiotemporally Encoded Features

Figure 6:
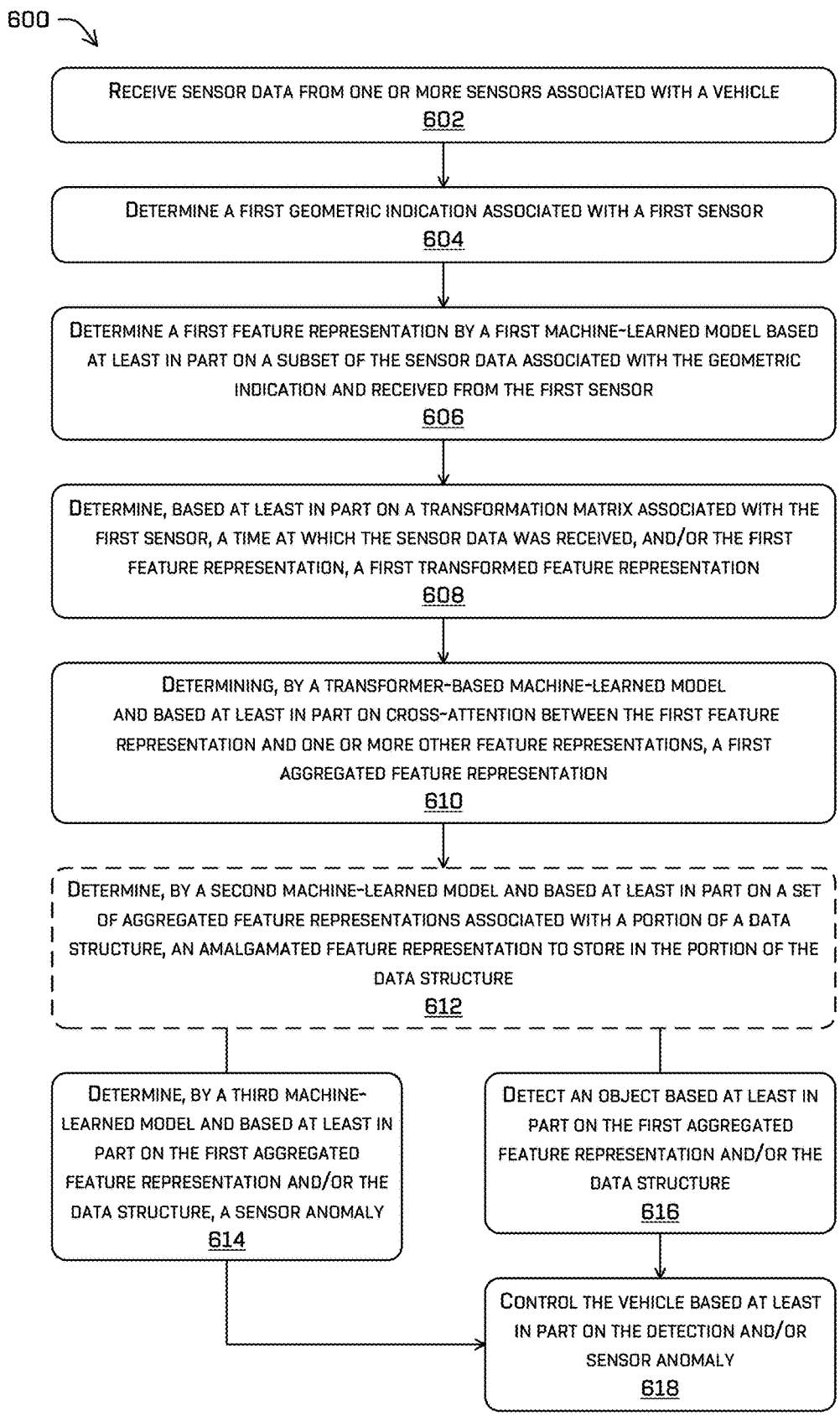
FIG. 6 illustrates a flow diagram of an example process for generating a data structure as described herein that may be used for object detection, object tracking, and/or sensor anomaly detection.

FIG. 6 illustrates a flow diagram of an example process 600 for generating an aggregated feature representation, amalgamated feature representation, and/or a data structure as described herein that may be used for object detection, tracking, and/or prediction and/or for sensor anomaly detection. The operations in the process 600 may be executed in parallel, separately, in series, and/or performed by the same device or different devices. For example, the operations can be implemented by a computing device of a vehicle 102 and/or remote computing device(s) 714. In some examples, example process 600 may additionally or alternatively comprise a precomputation comprising determining a set of rays (or other geometric indications) for each sensor of the vehicle for which sensor data is to be represented as an aggregated feature representation, amalgamated feature representation, or the data structure. This may comprise a ray casting operation that is based on a sensor's pose and bounded by the sensor's frustum. Additionally or alternatively, the precomputation may comprise portion of the data structure that is associated with each ray, such as by determining the portion of the data structure that is intersected by a ray or that is within a threshold tangent distance of the ray.

At operation 602, example process 600 may comprise receiving sensor data from sensor(s) associated with a vehicle, according to any of the techniques discussed herein. For example, the sensor data may be received from two or more sensors and the sensors may be different types/modalities of sensors (e.g., visible light camera, infrared camera, monocular camera, stereo camera, lidar, radar, ToF).

At operation 604, example process 600 may comprise determining a first geometric indication associated with a first sensor, according to any of the techniques discussed herein. In some examples, operation 604 may comprise updating a geometric indication, such as a ray, to indicate a new origin and/or unit vector based on a modification to a sensor pose and/or transformation matrix determined based on a sensor anomaly detected by the sensor anomaly detection component. Normally, operation 604 may comprise retrieving the original or last determined set of geometric indications generated for a sensor from memory (e.g., the pre-computed rays or altered rays). As discussed above, determining a set of geometric indications, such as rays, for a sensor may be based at least in part on a pose and/or frustum of the sensor.

At operation 606, example process 600 may comprise determining a first feature representation by a first machine-learned model based at least in part on a subset of the sensor data associated with the first geometric indication, according to any of the techniques discussed herein. In some examples, operation 606 may comprise determining a subset of a set of sensor data received from the first sensor, wherein determining the subset of sensor data comprises determining that the subset of the sensor data is intersected by the ray or is within a threshold distance of the ray. To give a practical, non-limiting, example, for an image, this may comprise determining a pixel that is intersected by a ray and/or determining a context window of pixels surrounding the pixel. For three-dimensional data, like lidar data, radar data, a stereo image, or the like, this may comprise determining sensor data intersected by the ray or determining a volume surrounding the ray (based on the threshold distance) and determining the sensor data contained within the volume. Additionally or alternatively, determining the subset of data for three-dimensional data may comprise a subset of sensor data contained by a voxel that is intersected by and/or within a threshold distance of the ray.

Once this subset of sensor data has been determined, operation 606 may comprise determining, by a first machine-learned model and based at least in part on the subset of sensor data, a feature representation, according to any of the techniques discussed herein. In some examples, the first machine-learned model may be an encoder, such as a transformer-based encoder that uses self-attention and/or cross-attention to determine the feature representation, a neural network, a multi-layer perceptron, or the like. In some examples, the feature representation may be an embedding or another feature representation, such as a field.

At operation 608, example process 600 may comprise determining, based at least in part on a transformation matrix associated with the first sensor, a time at which the sensor data was received from the first sensor, and/or the first feature representation, a first transformed feature representation, according to any of the techniques discussed herein. Operation 608 may comprise chunking the first feature representation into subsets of the first feature representation, treating individual subsets as if they represent an indication of a pose and/or time, and multiplying the individual subsets by the transformation matrix to generate transformed subsets. These transformed subsets may then be concatenated together to form the first transformed feature representation. In some examples, the transformation matrix (and subsets) may additionally or alternatively include an indication of velocity of the sensor or a velocity indicated by the sensor data. In other words, operation 608 may encode spatiotemporal data about the first sensor into the first feature representation.

At operation 610, example process 600 may comprise determining, by a transformer-based machine-learned model and based at least in part on the first feature representation and one or more other feature representations, a first aggregated feature representation, according to any of the techniques discussed herein. For example, operation 610 may comprise determining an attention output by a transformer-based machine-learned model and based at least in part on cross-attention between the first transformed feature representation, as a query, and a second transformed feature representation, as a key, wherein the second transformed feature representation is associated with a second subset of sensor data associated with a second geometric indication of the same or a different sensor. In some examples, the cross-attention may be further based on a value vector that is determined based at least in part on the second transformed feature representation or a second original feature representation from which the second transformed feature representation was generated. The transformer-based machine-learned model of operation 610 may comprise one or more blocks and each block may comprise a first block type or a second block type, as discussed above regarding FIG. 5A. In some examples, the transformer-based machine-learned model may comprise one or more multi-headed cross-attention blocks and/or one or more cross-attention blocks.

In some examples, operation 610 may comprise cross-attending the first transformed feature representation (and first feature representation in an example using the second block type) with all the other transformed feature representations (and original feature representations) generated for the first sensor and the other sensor(s) of the vehicle, or operation 610 may comprise cross-attending the first transformed feature representation (and first feature representation in an example using the second block type) with a subset of the other transformed feature representations (and original feature representations) generated for the first sensor and the other sensor(s) of the vehicle. The latter may be implemented in an example where the feature representations are filtered or weighted by a spatial filter that either masks (e.g., discards from use) any feature representations determined for geometric indications outside a threshold distance from the first geometric indication for which the first feature representation was determined, or that applies weights to the attention output(s) of the transformer-based machine-learned model as a function of distance form the first geometric indication.

The first aggregated feature representation may be associated with the first geometric indication and output to a perception component and/or sensor anomaly detection component, in which case example process 600 may continue to operation 616 and/or operation 618, respectively.

Additionally or alternatively, example process 600 may optionally generate a data structure based at least in part on the aggregated feature representations generated for the set of geometric indications associated with the sensors of the vehicle. In such an example, at operation 612, example process 600 may comprise determining, by a second machine-learned model and based at least in part on a set of aggregated feature representations associated with a portion of a data structure, an amalgamated feature representation to store in the portion of the data structure, according to any of the techniques discussed herein. For example, operation 614 may comprise determining a set of geometric indications that intersect the portion of the data structure and concatenating, summing, averaging, or fusing (by a machine-learned model) the set of aggregated feature representations associated with that set of geometric indications as an amalgamated feature representation to store in association with the portion of the data structure.

At operation 614, example process 600 may comprise determining, by a third machine-learned model and based at least in part on the first aggregated feature representation and/or the data structure, a sensor anomaly, according to any of the techniques discussed herein and as discussed in more detail regarding FIG. 5A.

At operation 616, example process 600 may comprise detecting an object, tracking the object, and/or predicting a future state of the object based at least in part on the first aggregated feature representation and/or the data structure, according to any of the techniques discussed herein. For example, operation 616 may comprise determining the object detection (e.g., a position, orientation, yaw rate, velocity, region of interest, object classification, mutable state, and/or the like associated with the object), track (e.g., current and historical series of object detections), and/or prediction by a machine-learned model trained to use first aggregated feature representation and/or the data structure as input. This machine-learned model may be trained to use the first aggregated feature representation and/or data structure as input and may output an indication of a region of the data structure associated with an object or a future state of the object (e.g., ray(s) and/or a portion of data structure associated with the object); a softmaxed output of a velocity, acceleration, yaw rate, and/or the like associated with a current and/or future state of the object; previous state(s) associated with the object (e.g., previous portion(s) data structure and/or region(s) associated with the object); and/or the like. Note that the softmaxed output may be used such that the machine-learned model may output an estimated or predicted velocity, or the like in association with up to each voxel of the voxel grid and/or region of the exterior portion, and that the softmax function may limit the output to only those velocity(ies), that satisfy the softmax function's conditions, thereby preventing every voxel and/or region to have a velocity, or the like associated therewith and just indicating velocity(ies), or the like in association with those voxel(s) and/or region(s) of the exterior portion that are associated with object(s).

This machine-learned model may be trained based at least in part on human labelling of the data structure or machine-learned model labelling of the data structure (e.g., such as by a machine-learned model that may be too computationally intensive with contemporary hardware to run on the vehicle). Training the machine-learned model may comprise determining a loss (e.g., L1, L2, Cauchy, Huber, contrastive) based at least in part on a difference between the labeled data structure and the object detection, track, and/or prediction output by the machine-learned model. This loss may be determined for differences in the exterior portion and may be backpropagated through the model(s) that determine amalgamated feature representations, aggregated feature representations, original feature representations, and so on. This backpropagation may comprise altering one or more parameters (e.g., weights, biases, activation function definitions) of any of these models to reduce the loss, according to gradient descent.

At operation 618, example process 600 may comprise controlling the vehicle based at least in part on the object detection, track, and/or prediction and/or the sensor anomaly, according to any of the techniques discussed herein.

Example Architecture

Figure 7:
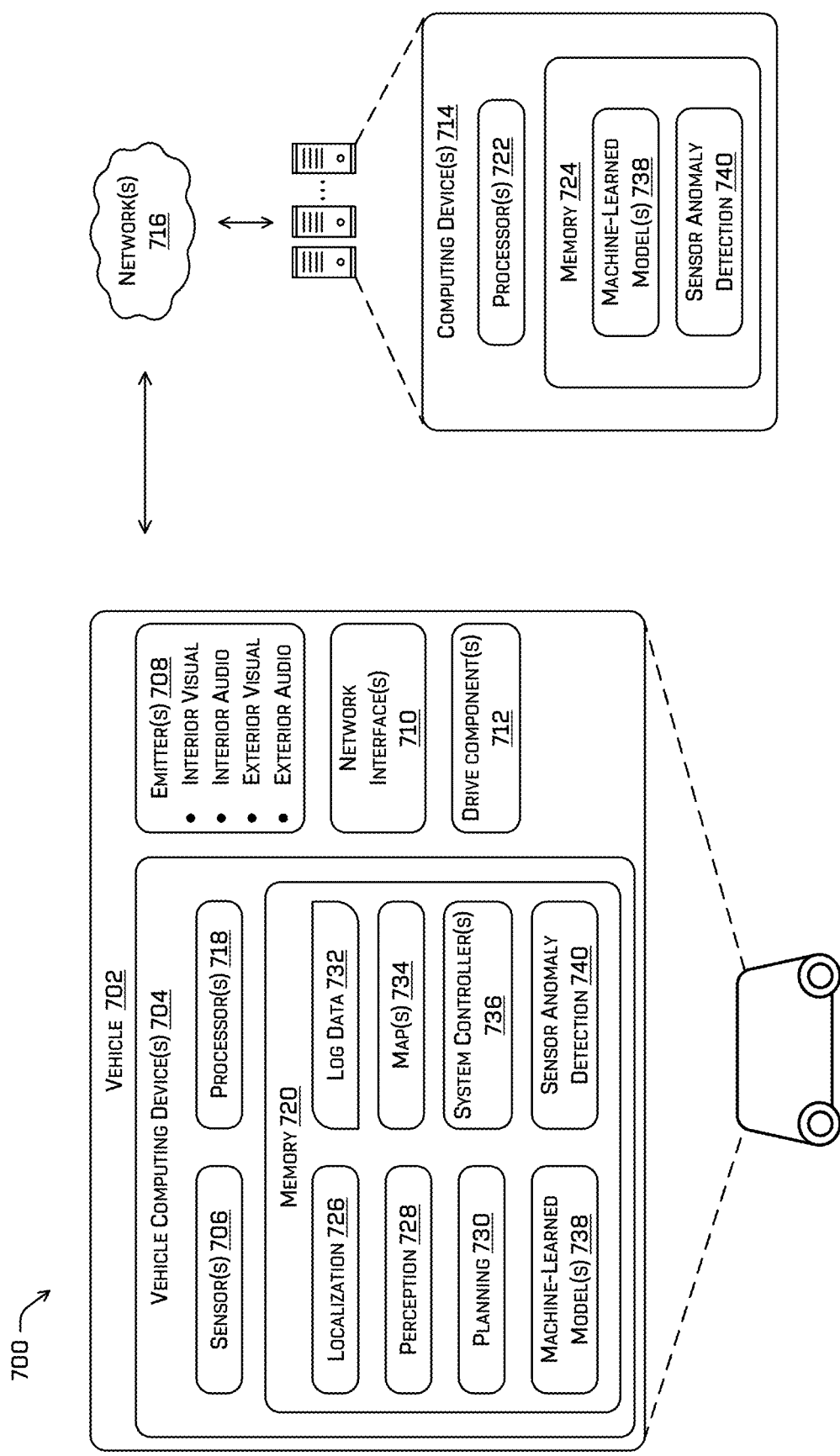
FIG. 7 illustrates an example architecture comprising a perception component and/or machine-learned model(s) for generating the data structure discussed herein.

FIG. 7 illustrates a block diagram of an example system 700 that implements the techniques discussed herein. In some instances, the example system 700 may include a vehicle 702, which may represent the vehicle 102 in FIG. 1. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well.

The vehicle 702 may include a vehicle computing device(s) 704, sensor(s) 706, emitter(s) 708, network interface(s) 710, and/or drive component(s) 712. Vehicle computing device(s) 704 may represent computing device(s) 106 and sensor(s) 706 may represent sensor(s) 104. The system 700 may additionally or alternatively comprise computing device(s) 714.

In some instances, the sensor(s) 706 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 714. The position and orientation (i.e., pose), field of view, and operational capabilities of a sensor may define a frustum associated with a sensor that may be used to bound the ray casting techniques discussed herein.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive component(s) 712. Also, the network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 714. In some examples, computing device(s) 714 may comprise one or more nodes of a distributed computing system (e.g., a cloud computing architecture).

The network interface(s) 710 may include physical and/or logical interfaces for connecting the vehicle computing device(s) 704 to another computing device or a network, such as network(s) 716. For example, the network interface(s) 710 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 2G, 3G, 4G, 4G LTE, 5G), or any suitable wired or wireless communications protocol that enables the respective computing device to interface with the other computing device(s). In some instances, the vehicle computing device(s) 704 and/or the sensor(s) 706 may send sensor data, via the network(s) 716, to the computing device(s) 714 at a particular frequency, after a lapse of a predetermined period of time, in near real-time, etc.

In some instances, the vehicle 702 may include one or more drive components 712. In some instances, the vehicle 702 may have a single drive component 712. In some instances, the drive component(s) 712 may include one or more sensors to detect conditions of the drive component(s) 712 and/or the surroundings of the vehicle 702. By way of example and not limitation, the sensor(s) of the drive component(s) 712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 712. In some cases, the sensor(s) on the drive component(s) 712 may overlap or supplement corresponding systems of the vehicle 702 (e.g., sensor(s) 706).

The drive component(s) 712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 712 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 712. Furthermore, the drive component(s) 712 may also include one or more communication connection(s) that enable communication by the respective drive component with one or more other local or remote computing device(s).

The vehicle computing device(s) 704 may include processor(s) 718 and memory 720 communicatively coupled with the one or more processors 718. Memory 720 may represent memory 108. Computing device(s) 714 may also include processor(s) 722, and/or memory 724. The processor(s) 718 and/or 722 may be any suitable processor capable of executing instructions to process data and perform operations as described herein. By way of example and not limitation, the processor(s) 718 and/or 722 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 720 and/or 724 may be examples of non-transitory computer-readable media that may store processor-executable instructions. The memory 720 and/or 724 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 720 and/or memory 724 may store a localization component 726, perception component 728, planning component 730, log data 732, map data 734, system controller(s) 736, machine-learned model(s) 738, and/or sensor anomaly detection component 740—zero or more portions of any of which may be hardware, such as GPU(s), CPU(s), and/or other processing units. Perception component 728 may represent perception component 110 and/or perception component 514, planning component 730 may represent planning component 112, system controller(s) 736 may represent controller(s) 114, machine-learned model(s) 738 may represent architecture 500 or portions thereof and/or part of machine-learned model(s) 116, and/or sensor anomaly detection component 740 may represent sensor anomaly component 516 and/or at least part of machine-learned model(s) 116.

In at least one example, the localization component 726 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 726 may include and/or request/receive map(s) of an environment, such as map data 734, and can continuously determine a location, velocity, and/or orientation of the autonomous vehicle within the map(s). In some instances, the localization component 726 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 726 may determine localization and/or mapping data comprising a pose graph (e.g., a sequence of position(s) and/or orientation(s) (i.e., pose(s)) of the vehicle 702 in space and/or time, factors identifying attributes of the relations therebetween, and/or trajectories of the vehicle for accomplishing those pose(s)), pose data, environment map including a detected static object and/or its distance from a pose of the vehicle 702, and/or the like In some instances, the localization component 726 may provide data to various components of the vehicle 702 to determine an initial position of an autonomous vehicle for generating a trajectory and/or for generating map data. In some examples, localization component 726 may provide, to the perception component 728 and/or planning component 730 a location and/or orientation of the vehicle 702 relative to the environment and/or sensor data associated therewith.

In some instances, perception component 728 may comprise a perception system and/or a prediction system implemented in hardware and/or software. The perception component 728 may determine the data structure discussed herein and may use it to detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 728 may include a prediction component that predicts actions/states of dynamic components of the environment, such as moving objects, although the prediction component may be separate, as in the illustration. In some examples, the perception component 728 may determine a top-down representation of the environment that encodes the position(s), orientation(s), velocity(ies), acceleration(s), and/or other states of the objects and/or map data in the environment. For example, the top-down representation may be an image with additional data embedded therein, such as where various pixel channel values encode the perception data and/or map data discussed herein. Data determined by the perception component 728 is referred to as perception data.

Additionally or alternatively, the perception component 728 may generate such outputs based at least in part on the transformed feature representations, aggregated feature representations, amalgamated feature representations, and/or data structure discussed herein.

The prediction component (of the perception component 728 or as an entirely separate component) may predict a future state of an object in the environment surrounding the vehicle 702. The future (predicted) state may indicate a predicted object position, orientation, velocity, acceleration, and/or other state (e.g., door state, turning state, intent state such as signaling turn) of a detected object. Data determined by the prediction component is referred to as prediction data and may be part of the perception data. In some examples, the prediction component may determine a top-down representation of a predicted future state of the environment. For example, the top-down representation may be an image with additional data embedded therein, such as where various channel pixel values encode the prediction data discussed herein.

In some examples, the prediction component may comprise the machine-learned model(s) 738, such as where the machine-learned model(s) 738 includes a MLP, KAN, neural network, or transformer-based machine-learned model for predicting a future state of an object using the transformed feature representations, aggregated feature representations, amalgamated feature representations, and/or data structure discussed herein.

The planning component 730 may receive a location and/or orientation of the vehicle 702 from the localization component 726 and/or perception data from the perception component 728 and may determine instructions for controlling operation of the vehicle 702 based at least in part on any of this data. In some examples, the memory 720 may further store map data 734 and this map data may be retrieved by the planning component 730 as part of generating environment state data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 712)) that the drive component(s) 712 may parse/cause to be carried out, second instructions for the emitter(s) 708 may be formatted according to a second format associated therewith).

In some examples, the log data 732 may comprise sensor data, perception data, prediction data (which may be part of the perception data), planning data, map data, and/or scenario data collected/determined by the vehicle 702 (e.g., by the perception component 728), as well as any other message generated and or sent by the vehicle 702 during operation including, but not limited to, control messages, error messages, etc. In some examples, the vehicle 702 may transmit the log data 732 to the computing device(s) 714.

In some examples, the map data 734 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 702; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

In some examples, the machine-learned model(s) 738 may comprise at least an encoder for determining a feature representation from a single type of sensor data or from multiple types of sensor data and/or an aggregation machine-learned model for determining a feature representation from multiple feature representations. In some examples, the machine-learned model(s) 738 may be trained on the remote computing device(s) 714 and transmitted to the vehicle 702. During pre-training the machine-learned model(s) 738 may further comprise a training decoder (when ground truth data is unavailable or isn't used) and/or an object detection component. For example, the machine-learned model(s) 738 may comprise a transformer-based machine-learned model or at least the encoder of a transformer-based machine-learned model, or a neural network for determining the feature representation(s) and/or depth estimate discussed herein. For example, the encoder(s) and decoder(s) discussed herein may form a transformer. For example, the encoder(s) and/or decoder(s) may have an architecture similar to visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like. Additionally or alternatively, the machine-learned model(s) 738 may comprise one or more neural network architectures, such as U-net; VQGAN, which combines an autoregressive transformer with convolutional network components (or any other generative adversarial network (GAN); CLIP (which can be used to enhance sensor data learning with natural language supervision); VQGAN and CLIP used together; Metric3Dv2; GCNDepth; AFNet; DistDepth; CLIP2Depth; or the like. The aggregation machine-learned model may comprise a machine-learned model such as a multi-layer perceptron, neural network, or transformer-based machine-learned model, such as a set of self-attention and/or cross-attention layer(s).

The machine-learned model(s) 738 may be pre-trained at computing device(s) 714 based at least in part on initial training data that is part of the log data 732. During this pre-training, the machine-learned model(s) 738 may comprise at least an encoder and a training decoder for the purposes of reconstruction training. During pre-training of the machine-learned model(s) 738, a training decoder may be appended to any of the encoders discussed herein (such as part of example architecture 500) to complete the transformer architecture. This training decoder may receive an embedding generated by the encoder and/or aggregation layer by virtue of being appended to/associated with the machine-learned model(s) 738. During this pre-training stage, this decoder is trained to estimate a reproduction or reconstruction of the original data that was provided to the encoder of the machine-learned model(s) 738 for the last training iteration.

For example, a training decoder may determine an estimate of the input data using an aggregated embedding generated by the encoder and the aggregation layer. The estimated input may be the training decoder's attempt to reconstruct the original data input to the encoder. As discussed herein, the difference between the estimate output by the training decoder and the original data input to the encoder may be used to determine, by a loss function (e.g., L1 loss, L2 loss, contrastive loss, Huber loss, Cauchy loss, squared of the mean-squared error loss), a loss that may be backpropagated through the training decoder and/or the encoder using gradient descent. For example, this may include altering one or more parameters of any one or more of the training decoder, components of the architecture 500, and/or the encoder to reduce the loss.

A parameter altered in the training may comprise a weight, bias, activation function definition, or other parameter of a portion of the respective component. This process may be repeated for multiple instances of input data. Note that this process requires no extra ground truth data—the input data serves as the ground truth data, different from typical training arrangements. Although in additional or alternate example, ground truth data may be used, in which case an object detection component may replace the training decoder discussed above and the loss computed based at least in part on a difference between a ground truth object detection and an object detection output by the object detection machine-learned model using the feature representation(s)/embedding(s) output by the encoder(s). In some examples, the reconstruction stage or pre-training may comprise masking a portion of the input data, such as by filling a portion of the input with nonce data (e.g., 0, removing a portion of the input entirely), which may result in training the training decoder to reconstruct the entire input data, including the masked portion. In some examples, the percentage of the input data that is masked may start at zero or a small percentage and may progressively increase per batch of training data or once the average reconstruction loss per batch is below a threshold loss.

This training functionally results in training the encoder to generate an embedding that is located within an embedding space that differentiates the instant input data from other input data. An embedding may include a tensor representation of the input data in a high-dimensional space called an embedding space. Note that this embedding space may be high-dimensional compared to two- or three-dimensions (e.g., hundreds of dimensions or thousands of dimensions), but may have less or even far less dimensions than the input data, which may number in the thousands or millions of dimensions. With training, an encoder differentiates between data by locating embeddings at different locations in the embedding space to signify their relative similarities, differences, attributes, etc.

After pre-training is complete, the training decoder (or object detection component) may be disassociated with the machine-learned model(s) 738, such as by removing the training decoder completely, by suppressing provision to the training decoder of the embedding(s) generated by the encoder, or the like. Thereafter, the machine-learned model(s) 738 may comprise at least the encoder(s) (where multiple encoders are used the encoder(s) may further include an aggregation layer, such as a concatenation layer, summation and/or averaging layer, and/or a multi-layer perceptron). Additionally or alternatively, after pre-training, one or more machine-learned components may be appended to the encoder and aggregation layer, such as the perception component, the sensor anomaly detection component, or other components of architecture 500. Additionally or alternatively, once the machine-learned model(s) 738 has been pre-trained and/or any additional component(s) have been trained, the encoder and additional machine-learned component(s) may be transmitted to the vehicle 702 for operation on the vehicle 702 as the machine-learned model(s) 738 stored at the vehicle 702. In some examples, before transmission the encoder may be distilled via knowledge distillation techniques.

The memory 720 and/or 724 may additionally or alternatively store a mapping system, a ride management system, simulation component, a logging component that aggregates the log data 732 from output(s) of respective components of the vehicle 702, etc.

As described herein, the localization component 726, the perception component 728, the planning component 730, the machine-learned model(s) 738, the sensor anomaly detection component 740, and/or other components of the system 700 may comprise one or more machine-learned (ML) models. For example, localization component 726, the perception component 728, the planning component 730, and/ or the machine-learned model(s) 738 (and components thereof), may each comprise different ML model pipelines. In some examples, an ML model may comprise a neural network. An exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 720 may additionally or alternatively store one or more system controller(s) 736 (which may be a portion of the drive component(s)), which may be configured to control steering, propulsion, braking, safety, emitters, communication, and other systems of the vehicle 702. These system controller(s) 736 may communicate with and/or control corresponding systems of the drive component(s) 712 and/or other components of the vehicle 702. For example, the planning component 730 may generate instructions based at least in part on perception data generated by the perception component 728 and/or simulated perception data and transmit the instructions to the system controller(s), which may control operation of the vehicle 702 based at least in part on the instructions.

It should be noted that while FIG. 7 is illustrated as a distributed system, in alternative examples, components of the vehicle 702 may be associated with the computing device(s) 714 and/or components of the computing device(s) 714 may be associated with the vehicle 702. That is, the vehicle 702 may perform one or more of the functions associated with the computing device(s) 714, and vice versa.

Example Clauses

A. A: A system comprising: one or more processors; and one or more non-transitory memory storing processor-executable instructions that, when executed by the one or more processors, cause the system to perform operations comprising: receiving sensor data from multiple sensors associated with an autonomous vehicle; determining a first ray associated with a first sensor of the multiple sensors; determining a first feature representation by a first machine-learned model based at least in part on a first subset of the sensor data associated with the first ray and received from the first sensor; determining, based at least in part on a transformation associated with the first sensor indicating a time associated with the first subset of the sensor data and one or more of a relative position or orientation of the first sensor to the autonomous vehicle, a first transformed feature representation comprising a plurality of transformations of different portions of the first feature representation; determining, by a transformer-based machine-learned model based at least in part on cross-attention between the first transformed feature representation and a set of other transformed feature representations, an aggregated feature representation; determining, by a second machine-learned model based at least in part on the aggregated feature representation, at least one of an object detection, an object track, or a future state of an object; and controlling the autonomous vehicle based at least in part on at least one of the object detection, the object track, or the future state.

B: The system of paragraph A, wherein determining a first transformation of the plurality of transformations comprises altering the first feature representation by the transformation to encode time associated with the first subset of the sensor data and the relative position and orientation of the first sensor.

C: The system of either paragraph A or B, wherein determining the set of other transformed feature representations comprises determining transformed feature representations determined for rays: within a threshold distance of the first ray emanating from the first sensor or are a nearest n rays to the first ray, where n is a positive integer, and that intersect part of an image that is also intersected by the first ray.

D: The system of any one of paragraphs A-C, wherein: the sensor data comprises image data from a set of cameras and at least one of radar data from a set of radar sensors or lidar data from a set of lidar sensors; the first subset of the sensor data comprises a portion of the sensor data comprising at least one of a pixel of the image data, a radar return, or a lidar return; and determining the first feature representation by the first machine-learned model is further based at least in part on context data comprising the first subset of the sensor data within a threshold distance of the portion of the sensor data.

E: The system of any one of paragraphs A-D, wherein: the operations further comprise determining, by a second transformer-based machine-learned model and based at least in part on cross-attention between the first feature representation and a second feature representation, a first preliminary attention output; and the aggregated feature representation is determined by determining, by a third machine-learned model and based at least in part on the first preliminary attention output and the cross-attention between the first transformed feature representation and the set of other transformed feature representations.

F: A method comprising: receiving sensor data; determining a first subset of the sensor data associated with a first sensor; determining a first feature representation by a first machine-learned model based at least in part on the first subset of the sensor data; determining, based at least in part on a transformation indicating a time at which the first subset of the sensor data was received and one or more of a position or orientation of the first sensor, a first transformed feature representation comprising a plurality of transformations of different portions of the first feature representation; determining, by a machine-learned model and based at least in part the first transformed feature representation and a second transformed feature representation determined based at least in part on a different subset of sensor data received by the first sensor or a second sensor, an aggregated feature representation; and controlling a vehicle based at least in part on the aggregated feature representation.

G: The method of paragraph F, wherein determining a first transformation of the plurality of transformations comprises altering the first feature representation by a transformation matrix to encode time associated with the first subset of the sensor data and a relative position and orientation of the first sensor.

H: The method of either paragraph F or G, wherein the transformation further indicates a velocity of at least one of the vehicle or the first sensor.

I: The method of any one of paragraphs F-H, wherein determining the transformation uses a transformation matrix and wherein the method further comprises determining the transformation matrix based at least in part on: receiving an original transformation matrix indicating a relative position and orientation of the first sensor to the vehicle; determining, by a third machine-learned model based at least in part on at least one of the time, a velocity associated with the first sensor or indicated by the first subset of the sensor data, or additional sensor data, an alteration to the original transformation matrix, wherein the alteration encodes at least one of the time or the velocity; and altering, as the transformation matrix, the original transformation matrix by the alteration.

J: The method of any one of paragraphs F-I, wherein determining the aggregated feature representation comprises determining, by the machine-learned model, a cross-attention output between a key determined based at least in part on the first transformed feature representation and a query determined based at least in part on the second transformed feature representation.

K: The method of paragraph J, wherein: the method further comprises determining, by a second machine-learned model and based at least in part on cross-attention between the first feature representation and a second feature representation, a first preliminary attention output; and the aggregated feature representation is determined by determining, by a third machine-learned model and based at least in part on the first preliminary attention output and the cross-attention output, the aggregated feature representation.

L: The method of any one of paragraphs F-K, wherein the first subset of the sensor data comprises at least one of image, lidar, or radar data that lies within polar or cylindrical coordinates and having an infinite radius, an undefined radius, or a radius equal to or greater than a maximum range of one of multiple sensors from which the sensor data was received.

M: The method of any one of paragraphs F-L, wherein: the sensor data comprises image data from a set of cameras and at least one of radar data from a set of radar sensors or lidar data from a set of lidar sensors; the first subset of the sensor data comprises a portion of the sensor data comprising at least one of a pixel of the image data, a radar return, or a lidar return; and determining the first feature representation by the first machine-learned model is further based at least in part on context data comprising the first subset of the sensor data within a threshold distance of the portion of the sensor data.

N: One or more non-transitory computer-readable media storing processor-executable instructions that, when executed by one or more processors, perform operations comprising: receiving sensor data; determining a first subset of the sensor data associated with a first sensor; determining a first feature representation by a first machine-learned model based at least in part on the first subset of the sensor data; determining, based at least in part on a transformation indicating a time at which the first subset of the sensor data was received and one or more of a position or orientation of the first sensor, a first transformed feature representation comprising a plurality of transformations of different portions of the first feature representation; determining, by a machine-learned model and based at least in part the first transformed feature representation and a second transformed feature representation determined based at least in part on a different subset of sensor data received by the first sensor or a second sensor, an aggregated feature representation; and controlling a vehicle based at least in part on the aggregated feature representation.

O: The one or more non-transitory computer-readable media of paragraph N, wherein determining a first transformation of the plurality of transformations comprises altering the first feature representation by a transformation matrix to encode time associated with the first subset of the sensor data and a relative position and orientation of the first sensor.

P: The one or more non-transitory computer-readable media of either paragraph N or O, wherein the transformation further indicates a velocity of at least one of the vehicle or the first sensor.

Q: The one or more non-transitory computer-readable media of any one of paragraphs N-P, wherein determining the transformation uses a transformation matrix and wherein the operations further comprise determining the transformation matrix based at least in part on: receiving an original transformation matrix indicating a relative position and orientation of the first sensor to the vehicle; determining, by a third machine-learned model based at least in part on at least one of the time, a velocity associated with the first sensor or indicated by the first subset of the sensor data, or additional sensor data, an alteration to the original transformation matrix, wherein the alteration encodes at least one of the time or the velocity; and altering, as the transformation matrix, the original transformation matrix by the alteration.

R: The one or more non-transitory computer-readable media of any one of paragraphs N-Q, determining the aggregated feature representation comprises determining, by the machine-learned model, a cross-attention output between a key determined based at least in part on the first transformed feature representation and a query determined based at least in part on the second transformed feature representation.

S: The one or more non-transitory computer-readable media of paragraph R, wherein: the operations further comprise determining, by a second machine-learned model and based at least in part on cross-attention between the first feature representation and a second feature representation, a first preliminary attention output; and the aggregated feature representation is determined by determining, by a third machine-learned model and based at least in part on the first preliminary attention output and the cross-attention output, the aggregated feature representation.

T: The one or more non-transitory computer-readable media of any one of paragraphs N-S, wherein the first subset of the sensor data comprises at least one of image, lidar, or radar data that lies within polar or cylindrical coordinates and having an infinite radius, an undefined radius, or a radius equal to or greater than a maximum range of one of multiple sensors from which the sensor data was received.

U: A system comprising: one or more processors; and one or more non-transitory memory storing processor-executable instructions that, when executed by the one or more processors, cause the system to perform operations comprising: receiving sensor data from multiple sensors associated with an autonomous vehicle; determining, based at least in part on a pose of a first sensor of the multiple sensors, a subset of the sensor data associated with the first sensor and a portion of a field-of-view of the first sensor; determining a first feature representation by a first machine-learned model based at least in part on the subset of the sensor data; determining, based at least in part on a transformation associated with the pose of the first sensor and a time at which the subset of the sensor data was received, a first transformed feature representation comprising a plurality of transformations of different portions of the first feature representation; determining, by a transformer-based machine-learned model based at least in part on cross-attention between the first transformed feature representation and a set of other transformed feature representations, an aggregated feature representation; determining, by a second machine-learned model based at least in part on the aggregated feature representation, a sensor anomaly; and controlling the autonomous vehicle based at least in part on the sensor anomaly.

V: The system of paragraph U, wherein: the second machine-learned model comprises an output head comprise at least one of a set of neural network layers or a set of attention layers; and the sensor anomaly comprises a latency associated with the first sensor.

W: The system of paragraph V, wherein controlling the autonomous vehicle comprises at least one of: updating at least one of a current, historical, or predicted object position, orientation, or velocity based at least in part on the latency; or altering a trajectory for controlling the autonomous vehicle.

X: The system of either paragraph V or W, wherein the operations further comprise altering the transformation associated with the first sensor to indicate the latency.

Y: The system of any one of paragraphs V-X, wherein training the second machine-learned model comprises: shifting a time associated with training sensor data by a time period; determining, by the second machine-learned model and based at least in part on a second aggregated feature representation determined by the transformer-based machine-learned model based at least in part on the training sensor data, an estimated latency; determining a loss based at least in part on a difference between the estimated latency and the time period; and altering one or more parameters of the second machine-learned model to reduce the loss.

Z: The system of any one of paragraphs U-Y, wherein: the sensor anomaly comprises at least one of: determining that a relative pose of the first sensor to a pose of the autonomous vehicle or a second sensor has changed; or determining that first sensor is miscalibrated; and the operations further comprise altering the transformation associated with the first sensor to at least one of alter the relative pose of the first sensor or a calibration parameter associated with the first sensor.

AA: A method comprising: receiving sensor data from multiple sensors associated with an autonomous vehicle; determining, based at least in part on a pose of a first sensor of the multiple sensors, a subset of the sensor data associated with the first sensor and a portion of a field-of-view of the first sensor; determining a first feature representation by a first machine-learned model based at least in part on the subset of the sensor data; determining, based at least in part on a transformation associated with the pose of the first sensor and a time at which the subset of the sensor data was received, a first transformed feature representation comprising a plurality of transformations of different portions of the first feature representation; determining, by a transformer-based machine-learned model based at least in part on cross-attention between the first transformed feature representation and a set of other transformed feature representations, an aggregated feature representation; determining, by a second machine-learned model based at least in part on the aggregated feature representation, a sensor anomaly; and controlling the autonomous vehicle based at least in part on the sensor anomaly.

AB: The method of paragraph AA, wherein: the second machine-learned model comprises an output head comprise at least one of a set of neural network layers or a set of attention layers; and the sensor anomaly comprises a latency associated with the first sensor.

AC: The method of paragraph AB, wherein controlling the autonomous vehicle comprises at least one of: updating at least one of a current, historical, or predicted object position, orientation, or velocity based at least in part on the latency; or altering a trajectory for controlling the autonomous vehicle.

AD: The method of either paragraph AB or AC, further comprising altering the transformation associated with the first sensor to indicate the latency.

AE: The method of any one of paragraphs AB-AD, wherein training the second machine-learned model comprises: shifting a time associated with training sensor data by a time period; determining, by the second machine-learned model and based at least in part on a second aggregated feature representation determined by the transformer-based machine-learned model based at least in part on the training sensor data, an estimated latency; determining a loss based at least in part on a difference between the estimated latency and the time period; and altering one or more parameters of the second machine-learned model to reduce the loss.

AF: The method of any one of paragraphs AA-AE, wherein the second machine-learned model further determines a confidence score associated with the sensor anomaly.

AG: The method of any one of paragraphs AA-AF, wherein: the sensor anomaly comprises at least one of: determining that a relative pose of the first sensor to a pose of the autonomous vehicle or a second sensor has changed; or determining that first sensor is miscalibrated; and the method further comprises altering the transformation associated with the first sensor to at least one of alter the relative pose of the first sensor or a calibration parameter associated with the first sensor.

AH: The method of any one of paragraphs AA-AG, wherein the sensor anomaly comprises a false positive object detection.

AI: One or more non-transitory computer-readable media storing processor-executable instructions that, when executed by one or more processors, perform operations comprising: receiving sensor data from multiple sensors associated with an autonomous vehicle; determining, based at least in part on a pose of a first sensor of the multiple sensors, a subset of the sensor data associated with the first sensor and a portion of a field-of-view of the first sensor; determining a first feature representation by a first machine-learned model based at least in part on the subset of the sensor data; determining, based at least in part on a transformation associated with the pose of the first sensor and a time at which the subset of the sensor data was received, a first transformed feature representation comprising a plurality of transformations of different portions of the first feature representation; determining, by a transformer-based machine-learned model based at least in part on cross-attention between the first transformed feature representation and a set of other transformed feature representations, an aggregated feature representation; determining, by a second machine-learned model based at least in part on the aggregated feature representation, a sensor anomaly; and controlling the autonomous vehicle based at least in part on the sensor anomaly.

AJ: The one or more non-transitory computer-readable media of paragraph AI, wherein: the second machine-learned model comprises an output head comprise at least one of a set of neural network layers or a set of attention layers; and the sensor anomaly comprises a latency associated with the first sensor.

AK: The one or more non-transitory computer-readable media of paragraph AJ, wherein controlling the autonomous vehicle comprises at least one of: updating at least one of a current, historical, or predicted object position, orientation, or velocity based at least in part on the latency; or altering a trajectory for controlling the autonomous vehicle.

AL: The one or more non-transitory computer-readable media of either paragraph AJ or AK, wherein the operations further comprise altering the transformation associated with the first sensor to indicate the latency.

AM: The one or more non-transitory computer-readable media of any one of paragraphs AJ-AL, wherein training the second machine-learned model comprises: shifting a time associated with training sensor data by a time period; determining, by the second machine-learned model and based at least in part on a second aggregated feature representation determined by the transformer-based machine-learned model based at least in part on the training sensor data, an estimated latency; determining a loss based at least in part on a difference between the estimated latency and the time period; and altering one or more parameters of the second machine-learned model to reduce the loss.

AN: The one or more non-transitory computer-readable media of any one of paragraphs AI-AM, wherein: the sensor anomaly comprises at least one of: determining that a relative pose of the first sensor to a pose of the autonomous vehicle or a second sensor has changed; or determining that first sensor is miscalibrated; and the operations further comprise altering the transformation associated with the first sensor to at least one of alter the relative pose of the first sensor or a calibration parameter associated with the first sensor; or the sensor anomaly comprises a false positive object detection.

While the example clauses described above are described with respect to one particular implementation, it should be understood that, in the context of this document, the content of the example clauses can also be implemented via a method, device, system, computer-readable medium, and/or another i006Dplementation. Additionally, any of examples A-AN may be implemented alone or in combination with any other one or more of the examples A-AN.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of item as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
    one or more processors; and
    one or more non-transitory memory storing processor-executable instructions that, when executed by the one or more processors, cause the system to perform operations comprising:
        receiving sensor data from multiple sensors associated with an autonomous vehicle;

determining a first ray associated with a first sensor of the multiple sensors;

determining a first feature representation by a first machine-learned model based at least in part on a first subset of the sensor data associated with the first ray and received from the first sensor;

determining, based at least in part on a transformation associated with the first sensor indicating a time associated with the first subset of the sensor data and one or more of a relative position or orientation of the first sensor to the autonomous vehicle, a first transformed feature representation comprising a plurality of transformations of different portions of the first feature representation;

determining, by a transformer-based machine-learned model based at least in part on cross-attention between the first transformed feature representation and a set of other transformed feature representations, an aggregated feature representation;

determining, by a second machine-learned model based at least in part on the aggregated feature representation, at least one of an object detection, an object track, or a future state of an object; and controlling the autonomous vehicle based at least in part on at least one of the object detection, the object track, or the future state.

2. The system of claim 1, wherein determining a first transformation of the plurality of transformations comprises altering the first feature representation by the transformation to encode time associated with the first subset of the sensor data and the relative position and orientation of the first sensor.

3. The system of claim 1, wherein determining the set of other transformed feature representations comprises determining transformed feature representations determined for rays:
within a threshold distance of the first ray emanating from the first sensor or are a nearest n rays to the first ray, where n is a positive integer, and
that intersect part of an image that is also intersected by the first ray.

4. The system of claim 1, wherein:
the sensor data comprises image data from a set of cameras and at least one of radar data from a set of radar sensors or lidar data from a set of lidar sensors;
the first subset of the sensor data comprises a portion of the sensor data comprising at least one of a pixel of the image data, a radar return, or a lidar return; and
determining the first feature representation by the first machine-learned model is further based at least in part on context data comprising the first subset of the sensor data within a threshold distance of the portion of the sensor data.

5. The system of claim 1, wherein:
the operations further comprise determining, by a second transformer-based machine-learned model and based at least in part on cross-attention between the first feature representation and a second feature representation, a first preliminary attention output; and
the aggregated feature representation is determined by determining, by a third machine-learned model and based at least in part on the first preliminary attention output and the cross-attention between the first transformed feature representation and the set of other transformed feature representations.

6. A method comprising:
receiving sensor data;
determining a first subset of the sensor data associated with a first sensor;
determining a first feature representation by a first machine-learned model based at least in part on the first subset of the sensor data;
determining, based at least in part on a transformation indicating a time at which the first subset of the sensor data was received and one or more of a position or orientation of the first sensor, a first transformed feature representation comprising a plurality of transformations of different portions of the first feature representation;
determining, by a machine-learned model and based at least in part the first transformed feature representation and a second transformed feature representation determined based at least in part on a different subset of sensor data received by the first sensor or a second sensor, an aggregated feature representation; and
controlling a vehicle based at least in part on the aggregated feature representation.

7. The method of claim 6, wherein determining a first transformation of the plurality of transformations comprises altering the first feature representation by a transformation matrix to encode time associated with the first subset of the sensor data and a relative position and orientation of the first sensor.

8. The method of claim 6, wherein the transformation further indicates a velocity of at least one of the vehicle or the first sensor.

9. The method of claim 6, wherein determining the transformation uses a transformation matrix and wherein the method further comprises determining the transformation matrix based at least in part on:
receiving an original transformation matrix indicating a relative position and orientation of the first sensor to the vehicle;
determining, by a third machine-learned model based at least in part on at least one of the time, a velocity associated with the first sensor or indicated by the first subset of the sensor data, or additional sensor data, an alteration to the original transformation matrix, wherein the alteration encodes at least one of the time or the velocity; and
altering, as the transformation matrix, the original transformation matrix by the alteration.

10. The method of claim 6, wherein determining the aggregated feature representation comprises determining, by the machine-learned model, a cross-attention output between a key determined based at least in part on the first transformed feature representation and a query determined based at least in part on the second transformed feature representation.

11. The method of claim 10, wherein:
the method further comprises determining, by a second machine-learned model and based at least in part on cross-attention between the first feature representation and a second feature representation, a first preliminary attention output; and
the aggregated feature representation is determined by determining, by a third machine-learned model and based at least in part on the first preliminary attention output and the cross-attention output, the aggregated feature representation.

12. The method of claim 6, wherein the first subset of the sensor data comprises at least one of image, lidar, or radar data that lies within polar or cylindrical coordinates and having an infinite radius, an undefined radius, or a radius equal to or greater than a maximum range of one of multiple sensors from which the sensor data was received.

13. The method of claim 6, wherein:
the sensor data comprises image data from a set of cameras and at least one of radar data from a set of radar sensors or lidar data from a set of lidar sensors;
the first subset of the sensor data comprises a portion of the sensor data comprising at least one of a pixel of the image data, a radar return, or a lidar return; and
determining the first feature representation by the first machine-learned model is further based at least in part on context data comprising the first subset of the sensor data within a threshold distance of the portion of the sensor data.

14. One or more non-transitory computer-readable media storing processor-executable instructions that, when executed by one or more processors, perform operations comprising:
receiving sensor data;
determining a first subset of the sensor data associated with a first sensor;
determining a first feature representation by a first machine-learned model based at least in part on the first subset of the sensor data;
determining, based at least in part on a transformation indicating a time at which the first subset of the sensor data was received and one or more of a position or orientation of the first sensor, a first transformed feature representation comprising a plurality of transformations of different portions of the first feature representation;
determining, by a machine-learned model and based at least in part the first transformed feature representation and a second transformed feature representation determined based at least in part on a different subset of sensor data received by the first sensor or a second sensor, an aggregated feature representation; and
controlling a vehicle based at least in part on the aggregated feature representation.

15. The one or more non-transitory computer-readable media of claim 14, wherein determining a first transformation of the plurality of transformations comprises altering the first feature representation by a transformation matrix to encode time associated with the first subset of the sensor data and a relative position and orientation of the first sensor.

16. The one or more non-transitory computer-readable media of claim 14, wherein the transformation further indicates a velocity of at least one of the vehicle or the first sensor.

17. The one or more non-transitory computer-readable media of claim 14, wherein determining the transformation uses a transformation matrix and wherein the operations further comprise determining the transformation matrix based at least in part on:
receiving an original transformation matrix indicating a relative position and orientation of the first sensor to the vehicle;
determining, by a third machine-learned model based at least in part on at least one of the time, a velocity associated with the first sensor or indicated by the first subset of the sensor data, or additional sensor data, an alteration to the original transformation matrix, wherein the alteration encodes at least one of the time or the velocity; and
altering, as the transformation matrix, the original transformation matrix by the alteration.

18. The one or more non-transitory computer-readable media of claim 14, determining the aggregated feature representation comprises determining, by the machine-learned model, a cross-attention output between a key determined based at least in part on the first transformed feature representation and a query determined based at least in part on the second transformed feature representation.

19. The one or more non-transitory computer-readable media of claim 18, wherein:
the operations further comprise determining, by a second machine-learned model and based at least in part on cross-attention between the first feature representation and a second feature representation, a first preliminary attention output; and
the aggregated feature representation is determined by determining, by a third machine-learned model and based at least in part on the first preliminary attention output and the cross-attention output, the aggregated feature representation.

20. The one or more non-transitory computer-readable media of claim 14, wherein the first subset of the sensor data comprises at least one of image, lidar, or radar data that lies within polar or cylindrical coordinates and having an infinite radius, an undefined radius, or a radius equal to or greater than a maximum range of one of multiple sensors from which the sensor data was received.

* * * * *